US011493777B2

(12) United States Patent
Yun et al.

(10) Patent No.: US 11,493,777 B2
(45) Date of Patent: Nov. 8, 2022

(54) OPTICAL STACK AND POLARIZING BEAM SPLITTER

(71) Applicant: 3M INNOVATIVE PROPERTIES COMPANY, St. Paul, MN (US)

(72) Inventors: Zhisheng Yun, Sammamish, WA (US); John D. Le, Woodbury, MN (US); Timothy J. Nevitt, Red Wing, MN (US); Susan L. Kent, Shorewood, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 164 days.

(21) Appl. No.: 16/768,925

(22) PCT Filed: Dec. 13, 2018

(86) PCT No.: PCT/IB2018/060028
§ 371 (c)(1),
(2) Date: Jun. 2, 2020

(87) PCT Pub. No.: WO2019/123141
PCT Pub. Date: Jun. 27, 2019

(65) Prior Publication Data
US 2020/0387003 A1    Dec. 10, 2020

Related U.S. Application Data

(60) Provisional application No. 62/608,194, filed on Dec. 20, 2017.

(51) Int. Cl.
*G02B 5/30* (2006.01)
*G02B 27/28* (2006.01)

(52) U.S. Cl.
CPC ........... *G02B 27/285* (2013.01); *G02B 5/305* (2013.01)

(58) Field of Classification Search
None
See application file for complete search history.

(56) References Cited

U.S. PATENT DOCUMENTS 5,882,774 A    3/1999    Jonza
6,179,948 B1   1/2001    Merrill
(Continued)

FOREIGN PATENT DOCUMENTS

WO    WO 2018-163009    9/2018
WO    WO 2019-073330    4/2019
(Continued)

OTHER PUBLICATIONS

Nevitt, "Recent Advances in Multilayer Polymeric Interference Reflector Products", Thin Solid Films, 2013, vol. 532, pp. 106-112, XP055576474.
(Continued)

*Primary Examiner* — Derek S. Chapel
(74) *Attorney, Agent, or Firm* — Clifton F. Richardson

(57) ABSTRACT

An optical stack including a first reflective polarizer adhered to a second reflective polarizer is described. For normally incident light and each wavelength in a same predetermined wavelength range, each reflective polarizer transmits at least 80% of light polarized along a pass axis of the reflective polarizer and reflects at least 90% of light polarized along an orthogonal block axis of the reflective polarizer. Each reflective polarizer includes a plurality of polymeric interference layers reflecting and transmitting light primarily by optical interference in the predetermined wavelength range. A separation between the two polymeric interference layers in the plurality of polymeric interference layers farthest from each other are d1 and d2 for the respective first and second reflective polarizers, d1 is at least 20% less than d2. Polar-
(Continued)

US 11,493,777 B2

Page 2 izing beam splitters including the optical stack and optical systems including the polarizing beam splitter are described.

15 Claims, 7 Drawing Sheets

(56) References Cited

U.S. PATENT DOCUMENTS

| | | | |
|---|---|---|---|
| 6,411,437 | B1 | 6/2002 | Cannon |
| 6,515,785 | B1 | 2/2003 | Cobb, Jr. et al. |
| 6,719,426 | B2 | 4/2004 | Magarill |
| 6,721,096 | B2 | 4/2004 | Bruzzone |
| 6,783,349 | B2 | 8/2004 | Neavin |
| 7,445,341 | B2 | 11/2008 | Conner |
| 7,568,804 | B2 | 8/2009 | Ma |
| 7,826,009 | B2 | 11/2010 | Weber |
| 8,382,293 | B2 | 2/2013 | Phillips, III |
| 9,535,256 | B2 | 1/2017 | Carls |
| 2004/0004778 | A1 | 1/2004 | Liu |
| 2004/0051947 | A1 | 3/2004 | Kagawa |
| 2004/0061937 | A1 | 4/2004 | Masubuchi |
| 2008/0151147 | A1 | 6/2008 | Weber |
| 2011/0102891 | A1 | 5/2011 | Derks et al. |
| 2011/0235175 | A1 | 9/2011 | Poon |
| 2011/0242653 | A1 | 10/2011 | Ouderkirk |
| 2011/0272849 | A1 | 11/2011 | Neavin |
| 2012/0320103 | A1 | 12/2012 | Jesme |
| 2014/0139787 | A1* | 5/2014 | Ki .................... G02B 5/305 |
| | | | 349/96 |
| 2014/0176818 | A1 | 6/2014 | Watson |
| 2014/0313572 | A1 | 10/2014 | Kivel |
| 2014/0320822 | A1 | 10/2014 | Carls |
| 2020/0183065 | A1* | 6/2020 | Haag ................ G02F 1/133615 |
| 2020/0319388 | A1* | 10/2020 | Ambur .................... G02B 1/14 |

FOREIGN PATENT DOCUMENTS

| | | |
|---|---|---|
| WO | WO 2019-077547 | 4/2019 |
| WO | WO 2019-162834 | 8/2019 |
| WO | WO 2020-115679 | 6/2020 |

OTHER PUBLICATIONS

International Search Report for PCT International Application No. PCT/IB2018/060028, dated Apr. 11, 2019, 6 pages.

* cited by examiner

OPTICAL STACK AND POLARIZING BEAM SPLITTER

BACKGROUND

A polarizing beam splitter may include a reflective polarizer disposed between the hypotenuses of adjacent prisms. The reflective polarizer may be a multilayer polymeric film.

SUMMARY

In some aspects of the present description, an optical stack including a first reflective polarizer adhered to a second reflective polarizer is provided. For normally incident light and each wavelength in a same predetermined wavelength range extending at least from 400 nm to 600 nm, each reflective polarizer transmits at least 80% of light polarized along a pass axis of the reflective polarizer and reflects at least 90% of light polarized along an orthogonal block axis of the reflective polarizer. An angle between the pass axes of the first and second reflective polarizers is less than about 10 degrees. Each reflective polarizer includes a plurality of polymeric interference layers reflecting and transmitting light primarily by optical interference in the predetermined wavelength range. A separation between the two polymeric interference layers in the plurality of polymeric interference layers farthest from each other are d1 and d2 for the respective first and second reflective polarizers. d1 is at least 20% less than d2.

In some aspects of the present description, a polarizing beam splitter (PBS) including a first prism comprising a first hypotenuse, a second prism comprising a second hypotenuse facing the first hypotenuse, and an optical stack disposed between and adhered to the first and second hypotenuses is provided. The optical stack includes a first reflective polarizer adhered to a second reflective polarizer. For normally incident light and each wavelength in a same predetermined wavelength range, each reflective polarizer transmits at least 80% of light polarized along a pass axis of the reflective polarizer and reflects at least 90% of light polarized along an orthogonal block axis of the reflective polarizer. An angle between the pass axes of the first and second reflective polarizers is less than about 10 degrees. Each reflective polarizer includes a plurality of polymeric interference layers reflecting and transmitting light primarily by optical interference in the predetermined wavelength range. A separation between the two polymeric interference layers in the plurality of polymeric interference layers farthest from another are d1 and d2 for the respective first and second reflective polarizers. d1 is at least 20% less than d2.

In some aspects of the present description, an optical construction comprising an optical stack disposed between and adhered to first and second optical elements is provided. The optical stack includes a first reflective polarizer facing the first optical element and adhered to a second reflective polarizer facing the second optical element. Each reflective polarizer transmits at least 80% of light polarized along a pass axis of the reflective polarizer and reflects at least 80% of light polarized along an orthogonal block axis of the reflective polarizer in a same predetermined wavelength range extending from a shorter first wavelength to a longer second wavelength. Coincident first and second light rays having the respective first and second wavelengths and incident at 45 degrees on each reflective polarizer from an inside of the optical element facing the reflective polarizer are reflected by the reflective polarizer as respective reflected first and second light rays spaced apart from each other by a separation distance inside the optical element facing the reflective polarizer. The separation distance is s1 for the first reflective polarizer and s2 for the second reflective polarizer, and 0<s1≤s2.

In some aspects of the present description, an optical system including a polarizing beam splitter (PBS) is provided. The PBS includes an optical stack comprising first and second polymeric reflective polarizers. For normally incident light and each wavelength in a wavelength range from about 400 nm to about 650 nm, each reflective polarizer transmits at least 80% of light polarized along a pass axis of the reflective polarizer and reflects at least 90% of light polarized along an orthogonal block axis of the reflective polarizer. The optical system further includes a light source facing the second reflective polarizer and an imager for modulating light facing the first reflective polarizer. First and second light rays emitted by the light source and having the respective 400 nm and 650 nm wavelengths exit the PBS as respective exiting first and second light rays after being at least once reflected and at least once transmitted by the second reflective polarizer, reflected by the imager along coincident paths, and at least once reflected by the first reflective polarizer. A lateral separation between the exiting first and second light rays is less than about 20 micrometers.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

In some embodiments, optical stacks are provided which include first and second reflective polarizers adhered together. The first and second reflective polarizers are typically multilayer polymeric optical films configured to reflect a block polarization state in a same predetermined wavelength range. In some cases, one of the reflective polarizers has a lower block state leakage and the other of the reflective polarizers has a lower color separation under reflection. For example, a thicker reflective polarizer (e.g., having more than one packet of interference layers where each packet is adapted to reflect the block state throughout a same predetermined wavelength range) can be used to provide a lower block state leakage, and a thinner reflective polarizer can be used to result in a smaller separation between the light paths of blue and red light, for example, that are obliquely incident on the reflective polarizer along coincident light paths. The optical stacks of the present description are useful in a variety of applications including polarizing beam splitters and display applications. In some embodiments, an optical construction includes the optical stack disposed between and adhered to two optical elements. The optical elements can be prisms or lenses, for example. In some embodiments, a polarizing beam splitter (PBS) including the optical stack is provided. The PBS can be used in display or other applications. In some embodiments, an optical system includes a PBS with the optical stack disposed so that a reflective polarizer that is thicker and/or that has a lower block state leakage faces a light source and so that a reflective polarizer that is thinner and/or that has a lower color aberration is disposed facing an imager. Such optical systems have been found to be useful in head-mounted displays or pico-projectors, for example.

Figure 1A:
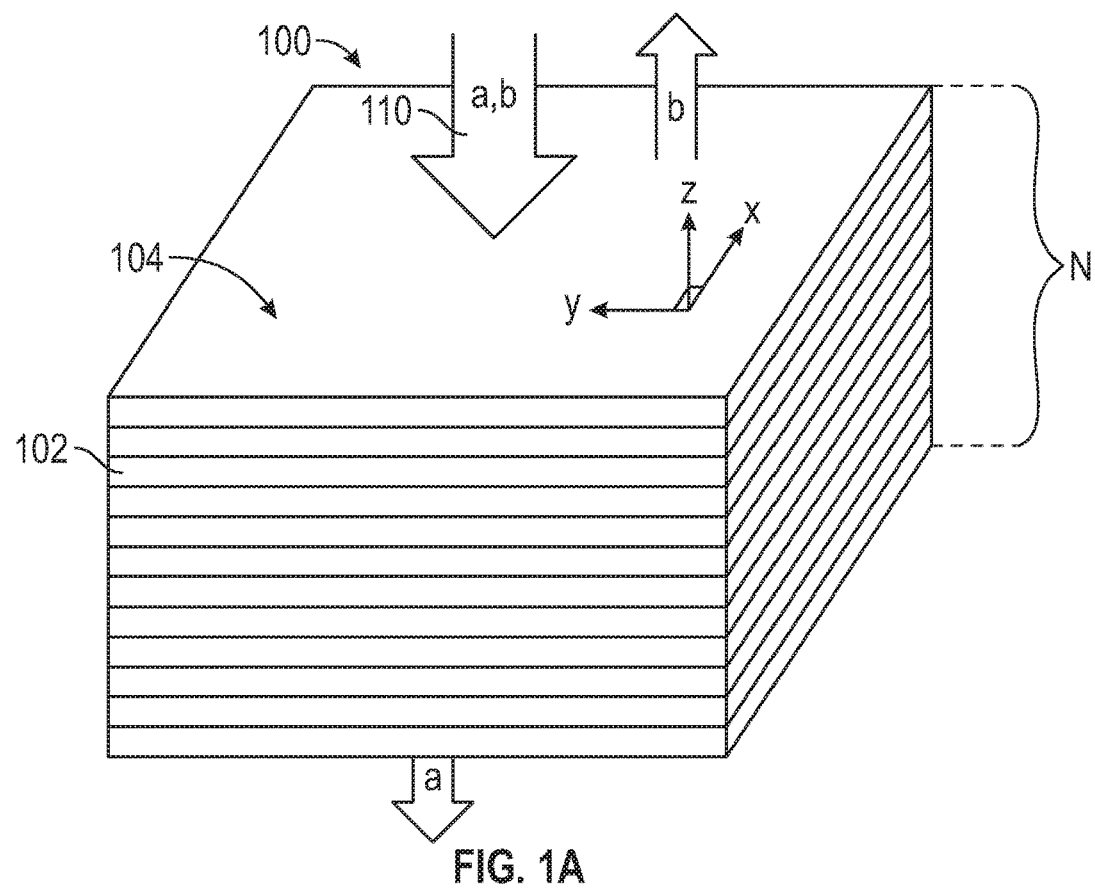
FIG. 1A is a schematic perspective view of a multilayer optical film.
Figure 1B:
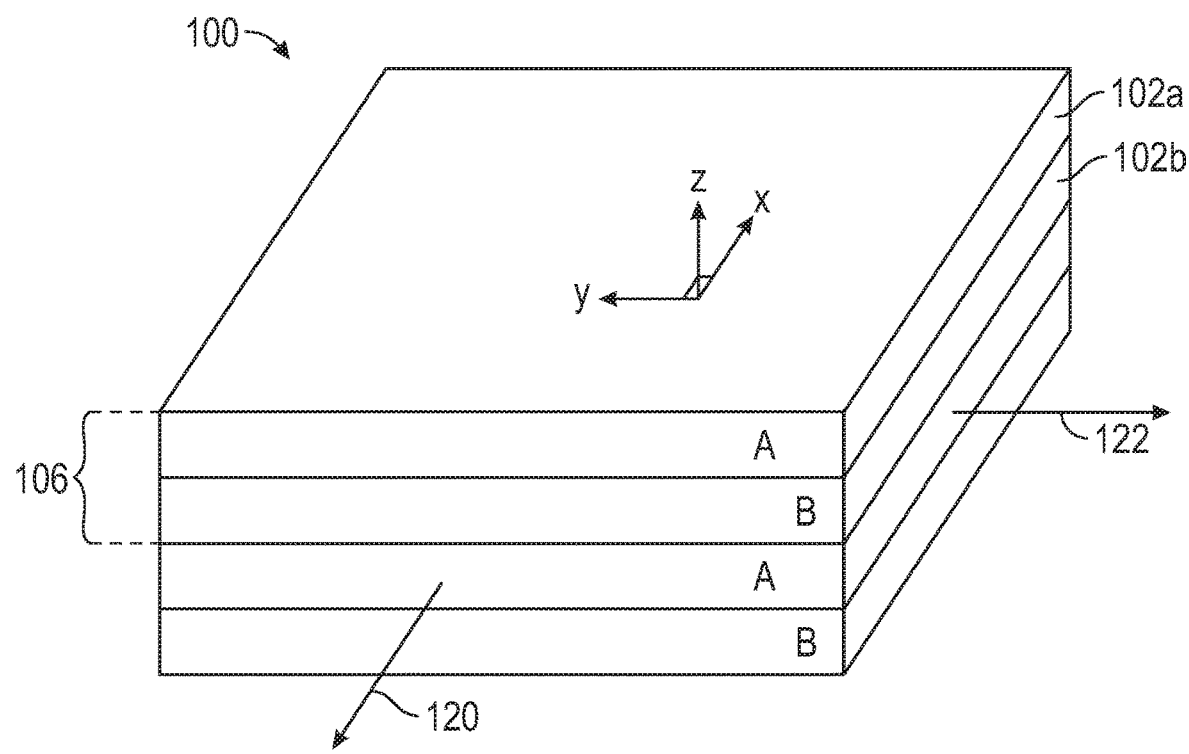
FIG. 1B is a schematic perspective view of a portion of the multilayer optical film of FIG. 1A.

In some embodiments, the reflective polarizers described herein may be characterized as a multilayer optical film having plurality of optical layers (e.g., interference layers) configured to selectively transmit and reflect light within a predetermined wavelength range. In some such embodiments, the optical films function as a reflective polarizer that selectively transmits and reflects light of different polarization states. For example, FIG. 1A is a schematic perspective view of an example of a multilayer optical film 100 that includes a plurality interference layers 102 positioned along a central axis to form optical film 100 having a total of (N) interference layers 102. FIG. 1B is a schematic perspective diagram of a segment of the optical film 100 illustrating alternating interference layers 102a and 102b. FIGS. 1A-1B include a coordinate system that defines x, y, and z directions.

During use, light incident on a major surface of optical film 100 (e.g., film surface 104), depicted by incident light 110 may enter a first layer of optical film 100 and propagate through the plurality of interference layers 102, undergoing select reflection or transmission by optical interference depending on the polarization state of incident light 110. Incident light 110 may include a first polarization state (a) and a second polarization state (b) that are be mutually orthogonal to one another. The first polarization state (a) may be considered as the "pass" state while the second polarization state (b) may be considered as the "reflected" or "block" state. As incident light 110 propagates through plurality of interference layers 102, portions of the light in the second polarization state (b) will be reflected by adjacent interference layers resulting in the second polarization state (b) being reflected by optical film 100, while a portion of the light in the first polarization state (a) collectively passes through optical film 100.

In some embodiments, the optical film 100 may be characterized in terms of its reflectivity and transmissivity of the first and second polarization states (a) and (b) of incident light 110. For example, the amount of incident light 110 for a predetermined wavelength transmitted through optical film 100 may be expressed as the percent of optical transmittance (Ta) for the first polarization state (a) and the percent of optical transmittance (Tb) for the second polarization state (b). The amount of incident light 110 for a predetermined wavelength range reflected by optical film 100 may be expressed as the percent of optical reflectance (Ra) for the first polarization state (a) and the percent of optical reflectance (Rb) for the second polarization state (b). For a given optical film, the sum of transmissivity, reflectivity, and losses due to, for example, absorption, will amount to 100% for light within a predetermined wavelength range. In some embodiments, the optical film 100 has a relatively low absorbance for light within the predetermined wavelength range. In some embodiments, the relatively low absorbance of incident light 110 by optical film 100 may result less heat generated within optical film 100 and leading to an overall more efficient reflective film.

The predetermined wavelength range may be any suitable wavelength range, including for example, visible light (e.g., about 400-700 nm), a range of visible light (e.g., about 400 nm, or about 450 nm to about 650 nm, or about 700 nm), near-infrared (e.g., about 800-1300 nm), a range based on the output of a light source such as a liquid crystal display backlight (e.g., 425-675 nm), and a range based on providing a desired bandwidth at off normal incidence (e.g., 400 nm or 450 nm to 1000 nm or to 1050 nm). In some embodiments, optical film 100 may be configured to transmit and reflect light of different polarizations states within more than one predetermined wavelength range, e.g., visible light and near-infrared. For example, the predetermined wavelength range may include a first range from about 430 nm to about 465 nm, a second range from about 490 nm to about 555 nm, and a third range from about 600 nm to about 665 nm. In some embodiments, optical film 100 may include multiple packets, as described further elsewhere herein, that each include a plurality of interference layers, where each packet may be directed to a different predetermined wavelength range or may be directed to a same predetermined wavelength range.

In some embodiments, the interference layers may be characterized as a series of two-layer unit cells or optical repeat units. The thickness of each unit cell may be configured to reflect a target wavelength within the predetermined wavelength range. In some examples, the central wavelength of reflectivity for a unit cell corresponds to the twice the optical thickness of a two-layer unit cell. Therefore, to reflect a predetermined wavelength range (e.g. 400 to 700 nm), the unit cells within the packets will have different thicknesses to cover wavelengths from the left band-edge to the right band-edge. The optical thickness of a layer refers to the index of refraction of the layer times the physical thickness of the layer. In the case of an optical film configured to reflect light polarized along a block axis and transmit light polarized along an orthogonal pass axis, the index of refraction used in determining the optical thickness is the index of refraction along the block axis. The two layers in the optical repeat units may have equal or approximately equal optical thicknesses. In some cases, it is useful to characterize the optical repeat unit in terms of an "f-ratio" which is the optical thickness of the higher index layer in the pair of layers divided by the total optical thickness of the layer pair. In some embodiments, the f-ratio is about 0.5. An f-ratio of 0.5 may be preferable since this maximizes the reflective power of the $1^{st}$ order (primary) reflection band of an optical film or packet of interference layers.

In some embodiments, optical film 100 includes less than about 1200 (N) interference layers 102, where each interference layer 102 reflects or transmits incident light 110 primarily by optical interference. In some embodiments, optical film 100 includes less than about 1000, or less than about 800, or less than about 600, or less than about 300 interference layers 102. While 1200 or more interference layers 102 may be included in optical film 100, in some cases, it may be desirable to achieve the desired optical performance using fewer total layers in order to reduce the overall thickness of the film, since reducing the overall thickness of a display assembly (e.g., LCD displays) is preferable in many applications. Additionally or alternatively, the fewer total number of interference layers 102 may reduce the complexity in of the manufacturing process as well as reduce the potential for introducing variability (e.g., spectral variability in block or pass states) or production errors (e.g., increased block state transmission due to depolarization between the layers, reduced pass state transmission) in the final optical film. In some embodiments, it may be desired to include a larger number interference layers 102 when it is desired to reduce block state leakage. In some embodiments, the total number N of interference layers 102 is greater than about 50, or greater than about 100, or greater than about 150, or greater than about 200. In some embodiments, an optical stack includes first and second optical films 100. Each optical film may have a total number N of interference layers in any of these ranges. In some embodiments, the first optical film has fewer total interference layers than the second optical film.

In some embodiments, the optical film 100 has an average optical transmittance (Ta) greater than about 80% for a first polarization state (a), an average optical reflectance (Rb) greater than about 90% for an orthogonal second polarization state (b), and, in some cases, an average optical transmittance (Tb) less than about 5% for the second polarization state (b) for an incident light 110 in a predetermined wavelength range and at a predetermined angle of incidence (angle between incident light ray and surface normal; e.g., 0 degrees corresponds to normal incidence). In some embodiments, Ta is greater than about 80%, or greater than about 85%, or greater than about 87% or greater than about 89%. In some embodiments, Rb is greater than about 90%, or greater than about 95%, or greater than about 96%, or greater than about 97%, or greater than about 98%. In some embodiments, Tb is less than about 5%, or less than about 4%, or less than about 3%, or less than about 2%, or less than about 1%, or less than about 0.5%, or less than about 0.3%, or less than about 0.2%, or less than about 0.1%, or less than about 0.05%, or less than about 0.04%, or less than about 0.03%, or less than about 0.02%, or less than about 0.01%. In some embodiments, a desired Ta, Tb and Rb is achieved using greater than about 50, or greater than about 100 and less than about 1200, or less than about 600 or less than about 300 total interference layers 102 in the optical film 100 or in an optical packet included in the optical film 100. A high Rb (e.g., greater than about 90%) and a low Tb (e.g., less than about 5%) with a relatively small number of layers can be achieved by choosing materials for the interference layers and controlling the stretch ratios of the film so that the refractive index difference between adjacent interference layers for light having the second polarization state is small (e.g., less than 0.008) and the refractive index difference between adjacent interference layers for light with the first polarization state is large (e.g., greater than about 0.2). The refractive index or index of refraction can be taken to be the index at a wavelength of 550 nm if no wavelength is specified.

In some embodiments, an optical stack is provided that includes first and second polymeric reflective polarizers where one or both reflective polarizers corresponds to optical film 100. The first and second reflective polarizers may have a Ta, Tb and Rb in any of the ranges described for optical film 100 for the same predetermined wavelength range. In some embodiments, the second reflective polarizer has a higher contrast ratio (Ta/Tb) than the first reflective polarizer. This may be a result of having a lower leakage (lower Tb), which can result from using a larger number N of interference layers 102 in the second reflective polarizer, than the first reflective polarizer. In some embodiments, the first reflective polarizer is substantially thinner (e.g., at least 20%) than the second reflective polarizer.

The transmittance of an optical film refers generally to the transmitted light intensity divided by the incident light intensity (for light of a given wavelength, incident direction, etc.), but may be expressed in terms of "external transmittance" or "internal transmittance". The external transmittance of an optical film is the transmittance of the optical film when immersed in air, and without making any corrections for Fresnel reflections at the air/element interface at the front of the element or for Fresnel reflections at the element/air interface at the back of the element. The internal transmittance of an optical film is the transmittance of the film when the Fresnel reflections at its front and back surfaces have been removed. The removal of the front and back Fresnel reflections may be done either computationally (e.g. by subtracting an appropriate function from the external transmission spectrum), or experimentally. For many types of polymer and glass materials, the Fresnel reflections are about 4 to 6% (for normal or near-normal angles of incidence) at each of the two outer surfaces, which results in a downward shift of about 10% for the external transmittance relative to the internal transmittance. If transmittance is referred to herein without being specified as internal or external, it may be assumed that the transmittance refers to external transmittance, unless otherwise indicated by the context.

In some embodiments, interference layers 102 of optical film 100 includes alternating layers (e.g., A and B depicted in FIG. 1B) of two different polymeric materials that exhibit differing index of refraction characteristics. As shown in FIG. 1B, optical film 100 includes of alternating layers (e.g., ABABA . . . ) of different optical materials referred to as material "(A)" and material "(B)". As described further elsewhere herein, the various layers of the two different materials may be formed through an extrusion/lamination process in which the layers are extruded together to form the multiple optical layers 102 (ABABA . . . ) that are adhered together.

In some embodiments, during the extrusion process the optical layers 102 may be stretched to impart the various interference characteristics of the film. For example, layers of the A and B optical material may be stretched (e.g., in a 5:1 ratio or a 6:1 ratio) along one axis (e.g., the X-axis), and not stretched appreciably along the orthogonal axis (e.g., the Y-axis). The indices of refraction along the X, Y and Z axes are denoted nx, ny, nz, respectively, for either the A or B layers. The indices of refraction may also be denoted as n1x, n1y, n1z and n2x, n2y, n2z for the A and B layers, respectively, along the along the X, Y and Z axes, respectively.

The selection of optical material used to form the A and B layers may be selected to impart specific optical characteristics to the film as a result of the stretching process. For example, the (B) material forming optical layers 102b may have a nominal index of refraction (e.g., n2 between 1.5 and 1.6) which is not substantially altered by the stretching process. As such, the index of refraction for "B" layers 102b in both the x and y directions (n2x and n2y) may be substantially the same for both directions after the stretching process and may be substantially the same as the index of refraction in the thickness direction (n2z). In contrast, the (A) material forming optical layers 102a may have an index of refraction altered by the stretching process. For example, a uniaxially stretched layer 102a of the (A) material may have a higher index of refraction in the X-axis or stretched direction 120 (e.g., $1.8 \leq n1x \leq 1.9$), and a different index of refraction associated with the Y-axis or non-stretched axis/direction 122 (e.g., $1.5 \leq n1y \leq 1.6$) which may substantially equal the index of refraction in the thickness direction (e.g., $1.5 \leq n1z \leq 1.6$). In some embodiments, an absolute value of a difference between n1y and n1z is less than 0.008 and a difference between n1x and n1y is greater than about 0.2. Due to the increased index of refraction in the stretched direction, layers 102a including material (A) may be considered as the high index of refraction (HIR) layers 102a while interference layers 102b including material (B) may be considered as the low index of refraction (LIR) layers 102b. In some embodiments, an absolute value of a difference between n2y and n2z is less than 0.005. In some embodiments, each of n2x, n2y and n2z is between 1.5 and 1.6. In some embodiments, the refractive indices of the alternating AB layers may be may be controlled by judicious materials selection and processing conditions. In some embodiments, the optical characteristics of the layers 102 causes optical film 100 to act as a reflecting polarizer that will substantially transmit the first polarization state (a) component of incident light 110 within a predetermined wavelength range oriented with respect to the non-stretched axis 122, while the stretched axis 120, will correspond to the reflect-axis for which the component of incident light 110 in second polarization state (b) within the predetermined wavelength range will be substantially reflected through optical interference.

In some embodiments, optical film 100 may be characterized by the difference between the indices of refraction between alternating HIR layers 102a and LIR layers 102b along the stretched axis 120 (i.e., $\Delta nx=n1x-n2x$). In some such embodiments, the indices of refraction between alternating HIR layers 102a and LIR layers 102b along the non-stretched axis 122 may be substantially the same such that the difference between the indices in non-stretched axis 122 (i.e., $\Delta ny=n1y-n2y$) is about 0.0 (e.g., $|\Delta ny|$ less than about 0.02, or less than about 0.01, or less than about 0.005). In some examples, increasing the $\Delta nx$ between HIR and LIR layers 102a, 102b (e.g., via choice of materials and/or control of the uniaxial orientation of the film) may permit sufficient transmission/reflection of polarized light for a given wavelength range using a fewer total number of interference layers as compared to an optical film with a lower $\Delta nx$ for with the same optical power.

Preferably, the stretched direction/axis of each of interference layers 102 will be substantially aligned (e.g., aligned or nearly aligned) such that the X-axis for each respective layer 102 represents the direction for obtaining the maximum index of refraction within the X-Y plane for each layer. However due to machine tolerances and number of interference layers 102, the stretched axis 120 for each of the interference layers (e.g., representing the direction of obtaining the maximum index or refraction for the layer) may be aligned to within a variance of about $\pm 2°$.

In some embodiments, for each pair of adjacent first and second layers 102a, 102b, the layers may define a stretched axis that represents the direction in which the maximum index of refraction obtained for the respective layer (e.g., X-axis/direction 120 corresponding to indices of refraction n1x and n2x for the two layers). The difference of indices of refraction between the first layer 102a and second layer 102b for the primary axis (e.g., $\Delta nx=n1x-n2x$) may be greater than about 0.2 or greater than about 0.24.

Optical film 100 including the plurality of interference layers 102 may be formed using any suitable technique. General techniques for forming multilayer optical films are described in U.S. Pat. No. 5,882,774 (Jonza et al.) "Optical Film", U.S. Pat. No. 6,179,948 (Merrill et al.) "Optical Film and Process for Manufacture Thereof", U.S. Pat. No. 6,783,349 (Neavin et al.) "Apparatus for Making Multilayer Optical Films", and patent application publication US 2011/0272849 (Neavin et al.) "Feedblock for Manufacturing Multilayer Polymeric Films". For example, layers 102a and 102b including optical materials A and B respectively may be fabricated using coextruding, casting, and orienting processes to form packets of tens to hundreds of interference layers 102, followed stretching or otherwise orienting the extruded layers to form a packet of interference layers 102. Each packet may include between about 200 and 1000 total interference layers depending on the desired characteristics of optical film 100. As used herein a "packet" is used to refer to a continuous set of alternating interference layers 102a, 102b that is absent of any spacer or non-interference layers formed within the packet (e.g., sequentially arranged). In some embodiments, spacer, non-interference layers, or other layers may be added to the outside of a given packet, thereby forming the outer layers of the film without disrupting the alternating pattern of interference layers 102 within the packet.

In some embodiments, optical film 100 may be fabricated by coextrusion. The fabrication method may comprise: (a) providing at least a first and a second stream of resin corresponding to the first and second polymers to be used in the finished film; (b) dividing the first and the second streams into a plurality of layers using a suitable feedblock, such as one that comprises: (i) a gradient plate comprising first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film.

After cooling, the multilayer web can be re-heated and drawn or stretched to produce the near-finished multilayer optical film. The drawing or stretching accomplishes two goals: it thins the layers to their desired final thicknesses profile, and it orients the layers such that at least some of the layers become birefringent. The orientation or stretching can be accomplished along the cross-web direction (e.g. via a tenter), along the down-web direction (e.g. via a length orienter), or any combination thereof, whether simultaneously or sequentially. If stretched along only one direction, the stretch can be "unconstrained" (wherein the film is allowed to dimensionally relax in the in-plane direction perpendicular to the stretch direction) or "constrained" (wherein the film is constrained and thus not allowed to dimensionally relax in the in-plane direction perpendicular to the stretch direction). If stretched along both in-plane directions, the stretch can be symmetric, i.e., equal along the orthogonal in-plane directions, or asymmetric. Alternatively, the film may be stretched in a batch process. In any case, subsequent or concurrent draw reduction, stress or strain equilibration, heat setting, and other processing operations can also be applied to the film.

The polymers of the various layers are preferably chosen to have similar rheological properties, e.g., melt viscosities, so that they can be co-extruded without significant flow disturbances. Extrusion conditions may be chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range.

Example (A) materials suitable for optical film 100 may include, for example, polyethylene naphthalate (PEN), copolymers containing PEN and polyesters (e.g., polyethylene terephthalate (PET) or dibenzoic acid), glycol modified polyethylene terephthalate. Example (B) materials suitable for optical film 100 may include, for example, copolyesters based on PEN, copolyesters based on PET, polycarbonate (PC), or blends of these three classes of materials. To achieve high reflectivities with a reasonable number of layers, adjacent microlayers can exhibit a difference in refractive index ($\Delta$nx) for light polarized along the x-axis of at least 0.2, for example.

In some embodiments, optical film 100 may have between about 100 to about 1200 total interference layers 102 with an overall thickness for optical film 100 of less than about 100 μm including any optional non-interference or protective layers. In some embodiments, optical film 100 has a total thickness of less than about 100 μm (e.g., less than 90 μm or in a range of 50 μm to 90 μm) across all of the layers of optical film 100. In some embodiments, an optical stack includes a first optical film 100 adhered to a second optical film 100 where each optical film is a reflective polarizer. In some embodiments, the first reflective polarizer has a thickness less than about than about 50 μm (e.g., in a range from 20 μm to 45 μm) and the second reflective polarizer has a thickness greater than the thickness of the first reflective polarizer and less than about 100 μm (e.g., in a range from 55 μm to 95 μm).

Figure 2A:
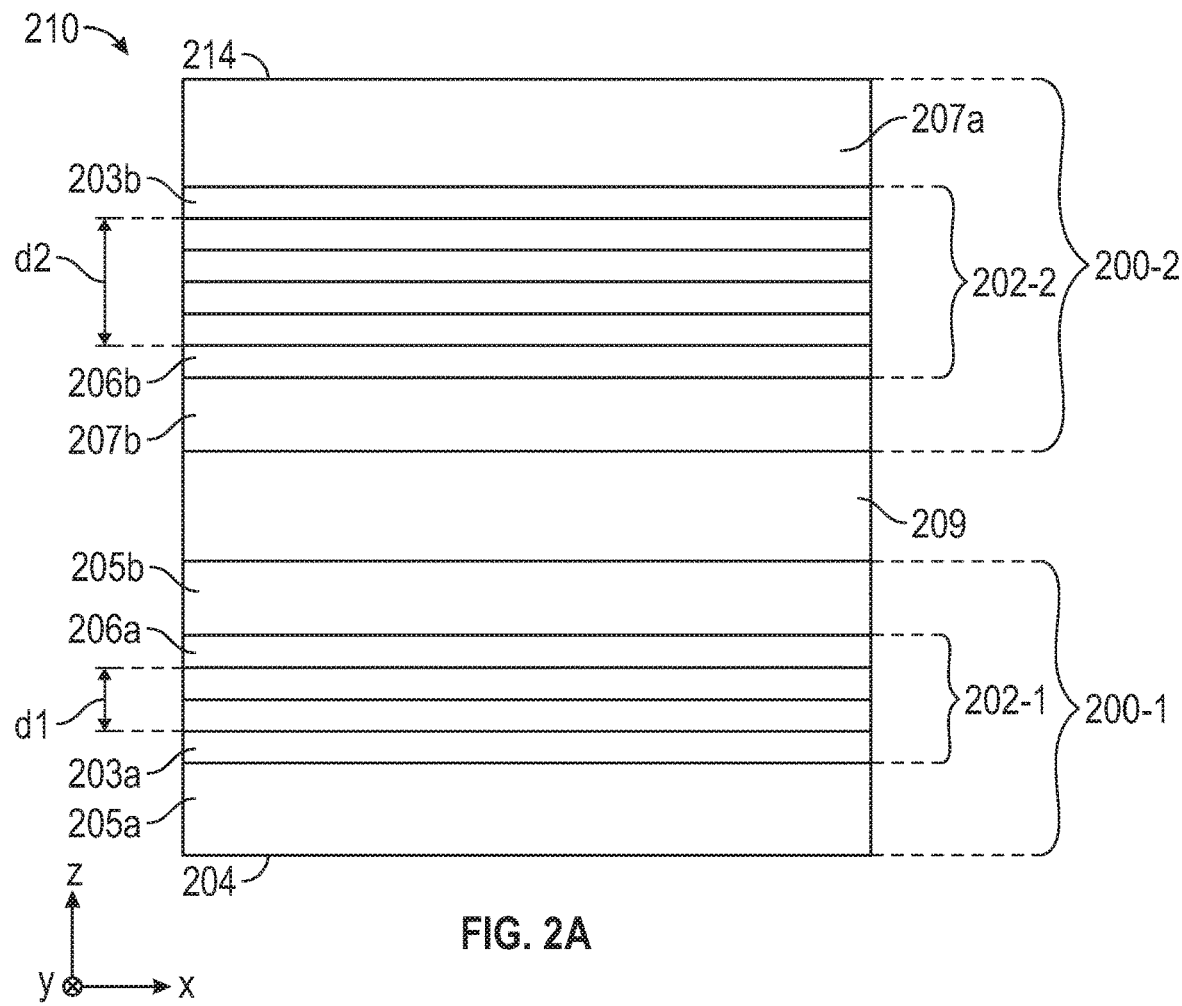
FIG. 2A is a schematic side view of an optical stack which includes first and second reflective polarizers.

In some embodiments, the thickness of the individual interference layers 102 may be relatively thin such that fewer than 30% of interference layers 102 have a thickness greater than about 200 nm (e.g., less than 5% of interference layers 102 may have a thickness greater than 200 nm or all interference layers 102 may have a thickness less than about 200 nm), but may vary as function of position within optical film 100. In some examples, optical film 100 may be characterized in terms of the film's thickness profile. For example, the thickness of the individual interference layers 102 may vary such that the thickness of the individual interference layers 102 generally increases (e.g., increasing thickens apart from local fluctuations) moving from an outermost interference layer to an interference layer near a center or near an opposite side of the optical film 100. In some embodiments, fewer than 30% of interference layers 102 have a thickness less than about 45 nm (e.g., less than 5% of interference layers 102 may have a thickness less than 45 nm or all interference layers 102 may have a thickness less than about 45 nm). FIG. 2A is a schematic cross-sectional view of optical stack 210 including first and second reflective polarizers 200-1 and 200-2. First reflective polarizer 200-1 includes a plurality of polymeric interference layers 202-1 and second reflective polarizer 200-2 includes a plurality of polymeric interference layers 202-2. A relatively small number of interference layers are shown for ease of illustration, but it will be understood that each of the first and second reflective polarizers 200-1 and 200-2 can include many more layers. The plurality of polymeric interference layers 202-1 include two polymeric interference layers 203a and 206a that are farthest from each other. The two polymeric interference layers 203a and 206a are separated by a distance d1. The plurality of polymeric interference layers 202-2 include two polymeric interference layers 203b and 206b that are farthest from each other. The two polymeric interference layers 203b and 206b are separated by a distance d2. In some embodiments, d1 is at least 20% less than d2. In other words, if d1 is expressed as (1−P) times d2, P is at least 0.2. In some embodiments, d1≤0.8 d2, or d1≤0.7 d2, or d1≤0.6 d2. In some embodiments, d1≥0.05 d2, or d1≥0.1 d2. In some embodiments, d1 is at least 500 nm, or at least 1 micrometer, or at least 2 micrometers, or at least 5 micrometers, or at least 10 micrometers, or at least 20 micrometers. In some embodiments, d2 is no more than 250 micrometers, or no more than 200 micrometers, or no more than 150 micrometers, or no more than 100 micrometers. In some embodiments, d2 is at least 50 micrometers, or at least 55 micrometers, or at least 60 micrometers. In some embodiments, d1 is less than 50 micrometers, or less than 45 micrometers, or less than 40 micrometers. For example, in some embodiments, d1 is in a range of 20 micrometers to 40 micrometers, and d2 is in a range of 50 micrometers to 200 micrometers.

First reflective polarizer 200-1 includes noninterference layers 205a and 205b and second reflective polarizer 200-2 includes noninterference layers 207a and 207b. These noninterference layers may be skin layer or protective boundary layers included with the reflective polarizer when it was formed Interference layers may be described as reflecting and transmitting light primarily by optical interference when the reflectance and transmittance of the interference layers can be reasonably described by optical interference or reasonably accurately modeled as resulting from optical interference. Adjacent pairs of interference layers having differing refractive indices reflect light by optical interference when the pair has a combined optical thickness (refractive index along the block axis times physical thickness) of ½ the wavelength of the light. Interference layers typically have a physical thickness of less than about 200 nanometers. In some embodiments, each polymeric interference layer has an average thickness (unweighted average of the physical thickness over the layer) in a range of about 45 nanometers to about 200 nanometers. Noninterference layers have an optical thickness too large to contribute to the reflection of visible light via interference. Noninterference layers typically have a physical thickness of at least 1 micrometer, or at least 5 micrometers. Noninterference layers 205a, 205b, 207a, and 207b do not reflect or transmit light primarily by optical interference.

The optical stack 210 has opposite outermost first and second major surfaces 204 and 214, the first reflective polarizer 200-1 disposed closer to the first major surface 204 and farther from the second major surface 214, the second reflective polarizer 200-2 disposed closer to the second major surface 214 and farther from the first major surface 204. In some embodiments, for each reflective polarizer and the major surface closest to the reflective polarizer, each polymeric interference layer closer to the major surface has a smaller optical thickness and each interference layer farther from the major surface has a larger optical thickness. For example, interference layer 203a may have a smaller optical thickness than interference layer 206a, and interference layer 203b may have a smaller optical thickness than interference layer 206b.

Optical stack 210 includes an intermediate layer 209 between the first and second reflective polarizers 200-1 and 200-2. In some embodiments, intermediate layer 209 is an adhesive layer bonding the first and second reflective polarizers 200-1 and 200-2 together. In some embodiments, the intermediate layer 209 is an optically clear adhesive layer. An optically clear adhesive layer may have a transmittance at normal incidence of at least 80%, or at least 90%, throughout a predetermined wavelength range (e.g., 400 nm to 700 nm) and an optical haze of less than 5%, or less than 3%. In other embodiments, the first and second reflective polarizers 200-1 and 200-2 may be integrally formed and intermediate layer 209 is a polymeric layer coextruded with the first and second reflective polarizers 200-1 and 200-2.

Figure 2B:
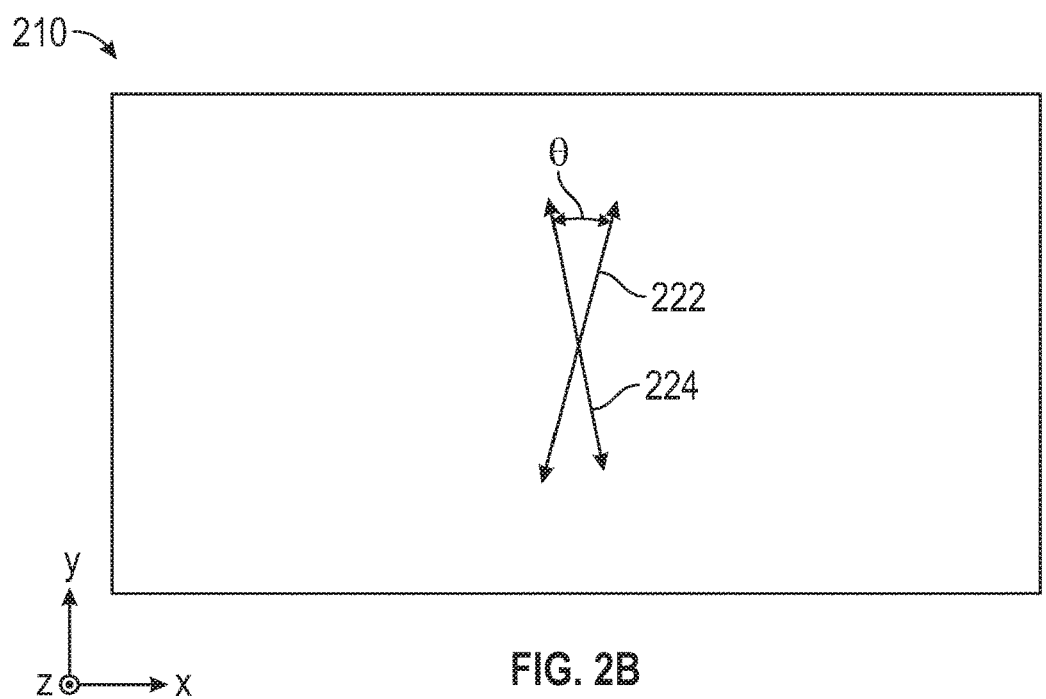
FIG. 2B is a schematic top view of the optical stack of FIG. 2A.

FIG. 2B is a schematic top view of optical stack 210 illustrating pass axes 222 and 224 of the first and second reflective polarizers 200-1 and 200-2, respectively. An angle θ between the pass axes 222 and 224 is illustrated. In some embodiments, the angle θ is less than about 10 degrees, or less than about 5 degrees, or less than about 2 degrees, or less than about 1 degree.

Figure 7:
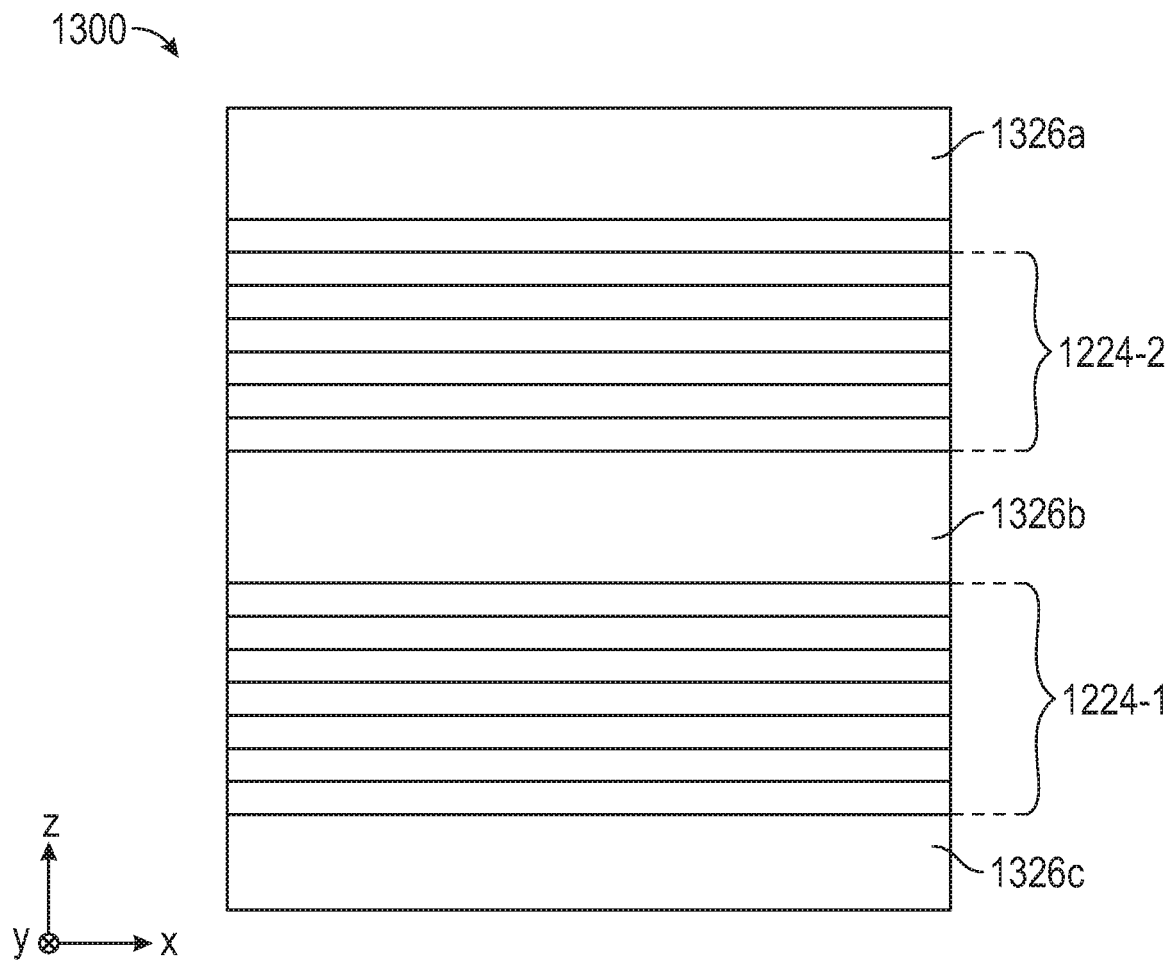
FIG. 7 is a schematic cross-sectional view of a reflective polarizer 1300.

In some embodiments, at least one of the reflective polarizers included in an optical stack includes more than one packet of interference layers. FIG. 7 is a schematic cross-sectional view of a reflective polarizer 1300 which includes first and second packets 1224-1 and 1224-2 of interference layers separated by noninterference layer 1326b. The reflective polarizer further includes outer noninterference layers 1326a and 1326c. The first and second packets 1224-1 and 1224-2 may utilize overlapping thickness ranges to provide a high contrast ratio (ratio of pass state transmittance to block state transmittance). In some embodiments, the thickness profiles substantially overlap (e.g., greater than 50 percent of a thickness range of a first packet overlaps greater than 50 percent of a thickness range of a second packet). In other embodiments, there is little or no overlap in the thickness ranges. Reflective polarizers including more than one packet of interference layers are described further in U.S. Prov. Pat. Appl. No. 62/467,712 (Haag et al.), filed Mar. 6, 2017.

For some applications of an optical stack including first and second reflective polarizers, it is preferred that the first reflective polarizer be thin and that the second reflective polarizer have a high contrast ratio. Accordingly, it may be desired for the first reflective polarizer to have one packet of interference layers and for the second reflective polarizer to include more than one packet of interference layers. For example, the reflective polarizer 1300 may be used as the second reflective polarizer 200-2 in the optical stack 210 while a reflective polarizer including a single packet of interference layers may be used as the first reflective polarizer 200-1 in the optical stack 210. Typically, both the first and second reflective polarizers are multilayer polymeric film reflective polarizers. However, in some cases other types of reflective polarizers (e.g., MacNeille) may be used.

The reflective polarizers of the present description may be integrally formed. As used herein, a first element "integrally formed" with a second element means that the first and second elements are manufactured together rather than manufactured separately and then subsequently joined. Integrally formed includes manufacturing a first element followed by manufacturing the second element on the first element. An optical film including a plurality of layers is integrally formed if the layers are manufactured together (e.g., combined as melt streams and then cast onto a chill roll to form a cast film having each of the layers, and then orienting the cast film) rather than manufactured separately and then subsequently joined. In some embodiments, the noninterference layers 1326a and 1326c are integrally formed with the first and second packets 1224-1 and 1224-2 of interference layers and the noninterference layer 1326b so that the reflective polarizer 1300 is integrally formed.

Figure 3:
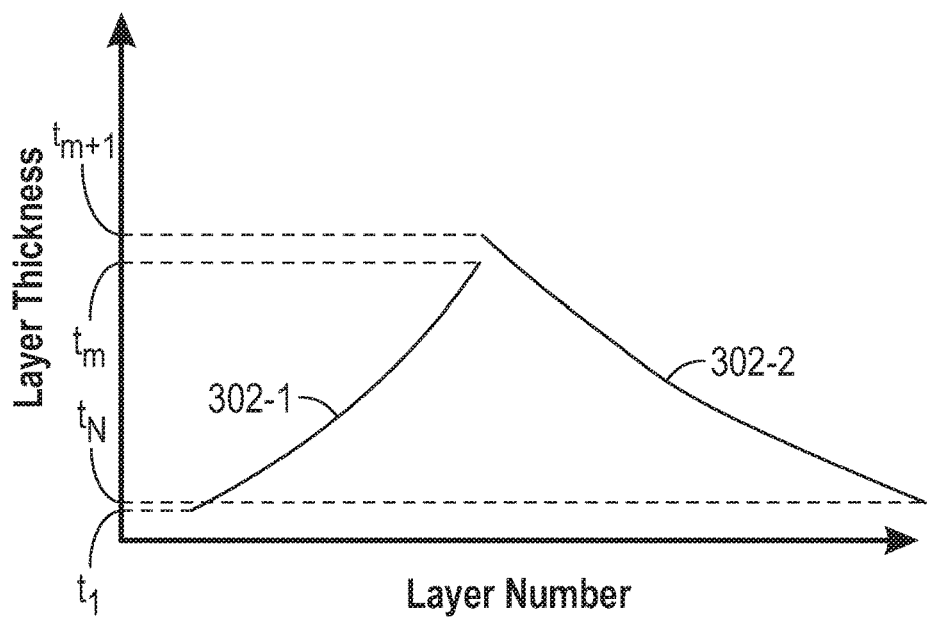
FIG. 3 is a schematic illustration of the layer thickness profile of an optical stack.

FIG. 3 is a schematic illustration of the layer thickness profile of an optical stack, such as optical stack 200, which includes two reflective polarizers. The first reflective polarizer includes a plurality of polymeric interference layers 302-1 having thicknesses ranging from $t_1$ at an outermost interference layer of the optical stack to $t_m$ at an outermost interference layer of the first reflective polarizer, which is an interior interference layer of the optical stack closest to the second reflective polarizer. The second reflective polarizer includes a plurality of polymeric interference layers 302-2 having thicknesses ranging from $t_{m+1}$ at an outermost interference layer of the second reflective polarizer, which is an interior interference layer of the optical stack closest to the first reflective polarizer, to $t_N$ at an outermost interference layer of the optical stack. In some embodiments, $|t_1-t_N|$ is less than about 20 nm, or less than about 15 nm, or less than about 12 nm, or less than about 10 nm, or less than about 8 nm, or less than about 7 nm, or less than about 6 nm. In some embodiments, $|t_m-t_{m+1}|$ is less than about 40 nm, or less than about 30 nm, or less than about 20 nm, or less than about 15 nm, or less than about 12 nm, or less than about 10 nm.

Figure 4:
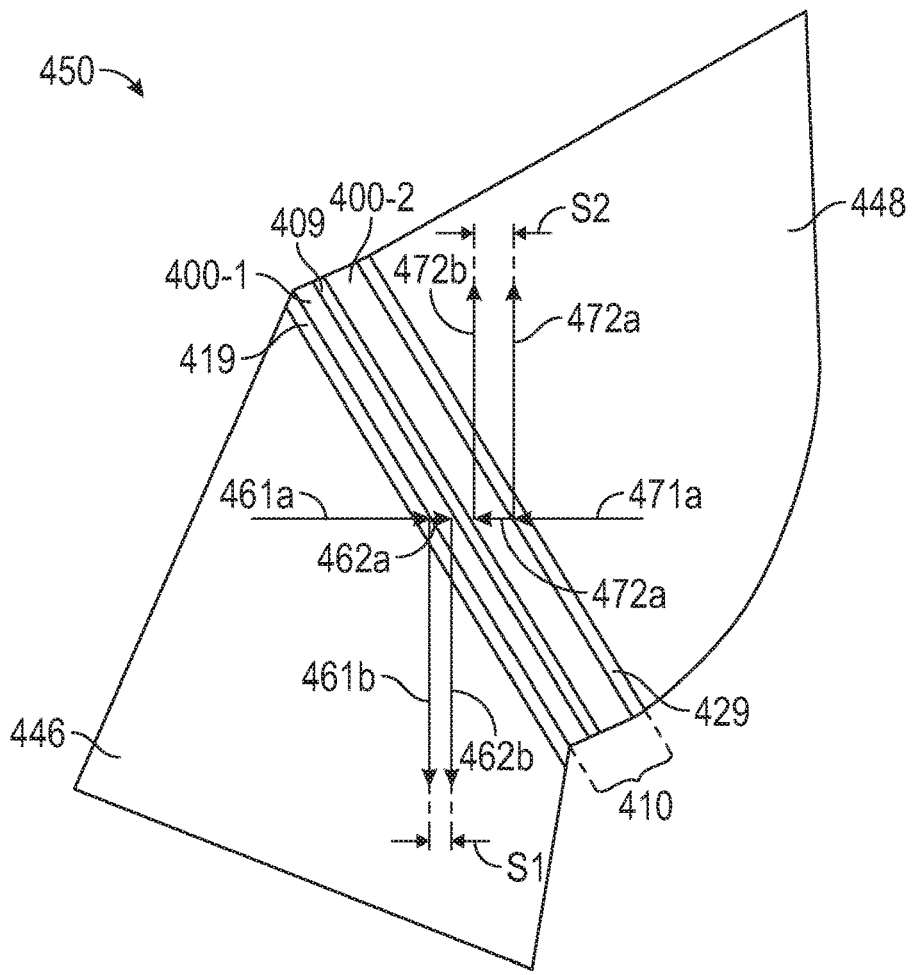
FIG. 4 is a schematic cross-sectional view of an optical construction.

FIG. 4 is a schematic cross-sectional view of an optical construction 450 including an optical stack 410 disposed between and adhered to first and second optical elements 446 and 448. Optical stack 410 includes first and second reflective polarizers 400-1 and 400-2 adhered together with adhesive 409. The first reflective polarizer 400-1 faces the first optical element 446 and the second reflective polarizer faces the second optical element 448. The optical stack 410 is adhered to the first optical element 446 with adhesive layer 419 and to the second optical element 448 with adhesive layer 429. The first and second optical elements 446 and 448 may have any suitable shape. In some embodiments, the first and second optical elements 446 and 448 are first and second prisms (e.g., corresponding to first and second prisms 530 and 540 or first and second prisms 630 and 640). In some embodiments, one or both of the first and second optical elements 446 and 448 are optical lenses. The optical stack may be disposed on planar or substantially planar faces of the first and second optical elements 446 and 448 or may be disposed on curved faces of the first and second optical elements.

In some embodiments, each of the first and second reflective polarizers 400-1 and 400-2 transmit at least 80% of light polarized along a pass axis of the reflective polarizer and reflect at least 80% of light polarized along an orthogonal block axis of the reflective polarizer in a same predetermined wavelength range extending from a shorter first wavelength to a longer second wavelength. In some embodiments, the first wavelength is 400 nm, or 450 nm, or in a range of about 400 nm to about 500 nm, or in a range of about 400 nm to about 450 nm. In some embodiments, the second wavelength is 650 nm, or 700 nm, or in a range of about 600 nm to about 700 nm, or in a range of about 650 nm to about 700 nm. The reflectance and transmittance may be specified at a predetermined angle of incidence such as normal incidence, or at a 45 degree angle of incidence, or at an angle of incidence appropriate for a given application, or the reflectance and transmittance may be specified for the distribution of angles of incidence occurring in a given application.

Coincident first and second light rays 461a and 462a having the respective first and second wavelengths and incident at 45 degrees on the first reflective polarizer 400-1 from an inside of the first optical element 446, are reflected by the first reflective polarizer 400-1 as respective reflected first and second light rays 461b and 462b spaced apart from each other by a separation distance s1 inside the first optical element 446. Coincident first and second light rays 471a and 472a having the respective first and second wavelengths and incident at 45 degrees on the second reflective polarizer 400-2 from an inside of the second optical element 448, are reflected by the second reflective polarizer 400-2 as respective reflected first and second light rays 471b and 472b spaced apart from each other by a separation distance s2 inside the second optical element 448.

In some embodiments, 0<s1≤s2. In some embodiments, s1 is greater than 500 nm, or greater than 1 micrometer, or greater than 2 micrometers, or greater than 5 micrometers, or greater than 10 micrometers. In some embodiments, s1 is less than 50 micrometers, or less than 30 micrometers, or less than 20 micrometers, or less than 18 micrometers, or less than 16 micrometers, or less than 14 micrometers, or less than 10 micrometers, or less than 8 micrometers, of less than 6 micrometers, or less than 4 micrometers, or less than 2 micrometers. For example, in some embodiments, s1 is in a range of 1 micrometer to 20 micrometers. In some embodiments, s2 is greater than s1, or greater than s1+500 nm, or greater than s1+1 micrometer, or greater than s1+2 micrometers, or greater than s1+5 micrometers, or greater than s1+10 micrometers. In some embodiments, s2 is no more than 250 micrometers, or no more than 200 micrometers, or no more than 150 micrometers, or no more than 100 micrometers. In some embodiments, s2 is at least 40 micrometers, or at least 50 micrometers, or at least 55 micrometers, or at least 60 micrometers.

In some embodiments, for each reflective polarizer, the outermost interference layers are configured to reflect the first and second wavelengths, respectively. In some such embodiments, s1 is about √2 d1 and, similarly, s2 is about √2 d2.

Figure 5:
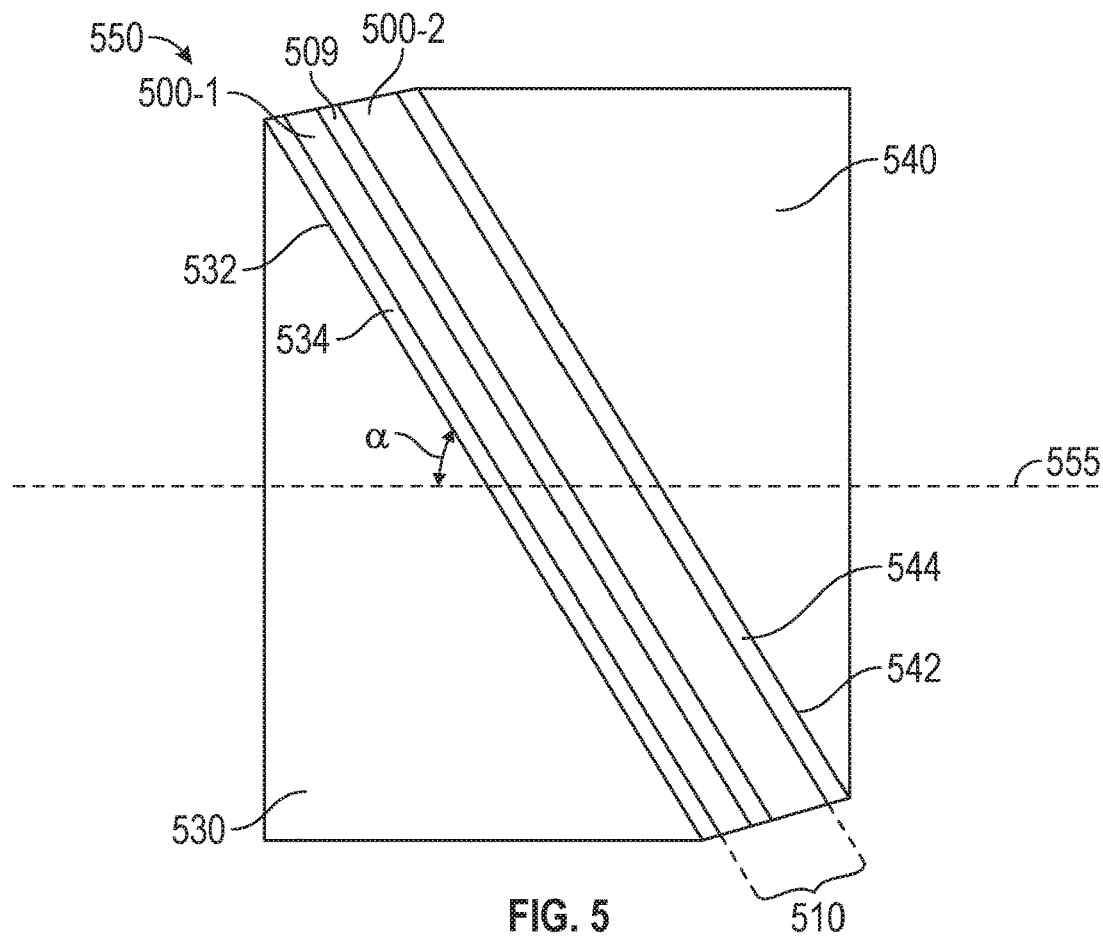
FIG. 5 is a schematic side views of a polarizing beam splitter.

FIG. 5 is a schematic side view of a polarizing beam splitter (PBS) 550. PBS 550 includes a first prism 530 having a first hypotenuse 532, and a second prism 540 having a second hypotenuse 542 which faces the first hypotenuse 532. An optical stack 510 is disposed between and adhered to the first and second hypotenuses 532 and 542 through first and second optically clear adhesive layers 534 and 544, respectively. The optical stack 510 includes a first reflective polarizer 500-1 adhered to a second reflective polarizer 500-2 via optically clear adhesive layer 509. The first reflective polarizer 500-1 is closer to the first hypotenuse 532 and farther from the second hypotenuse 542, and the second reflective polarizer 500-2 is closer to the second hypotenuse 542 and farther from the first hypotenuse 534.

In some embodiments, for each reflective polarizer and the hypotenuse closest to the reflective polarizer: the interference layers closer to the hypotenuse are configured to primarily reflect shorter wavelengths in the predetermined wavelength range and the interference layers farther from the hypotenuse are configured to primarily reflect longer wavelengths in the predetermined wavelength range. For example, the thickness profile of the interference layers in the optical stack 510 may appear as in FIG. 3 with thinner layers (which reflect shorter wavelengths) closer to the outer surfaces of the optical stack and thicker layers (which reflect longer wavelengths) farther from the outer surfaces of the optical stack.

In some embodiments, the PBS 550 has an optical axis 555 or is used in an optical system having the optical axis 555. In some embodiments, the optical axis 555 makes an angle α of about 30 to 60 degrees, or about 35 to 55 degrees, or about 40 to 50 degrees, or about 45 degrees with the optical stack 510.

The prisms used in the PBSs of the present description can be made from any suitable material. For example, the first and second prisms may, independently, be made from glass (e.g., BK7 glass) or polymeric materials such as polycarbonate or polyacrylate.

The polarizing beam splitters of the present description can be used in a variety of applications. For example, the PBSs may be used in an imaging or display system. The display system may be a head-mounted display such as a virtual reality display or an augmented reality display. The use of a PBS in various display applications is discussed, for example, in U.S. Pat. No. 8,382,293 (Phillips, III et al.), and U.S. Pat. No. 9,535,256 (Carls et al.). The PBSs of the present description can be used in place of the PBS of any of the optical systems described in these references. The PBSs of the present description are particularly advantageously used in optical systems where non-modulated light from a light source is reflected from one side of the optical stack and a spatially modulated light from an imager is reflected from an opposite side of the optical stack.

Figure 6A:
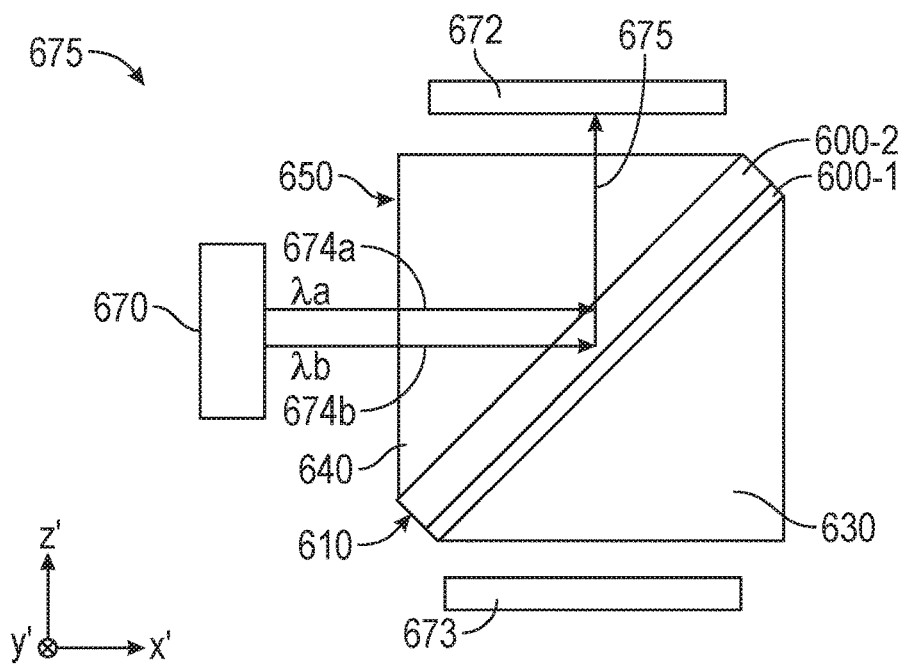
FIGS. 6A-6C are schematic cross-sectional views of an optical system.
Figure 6B:
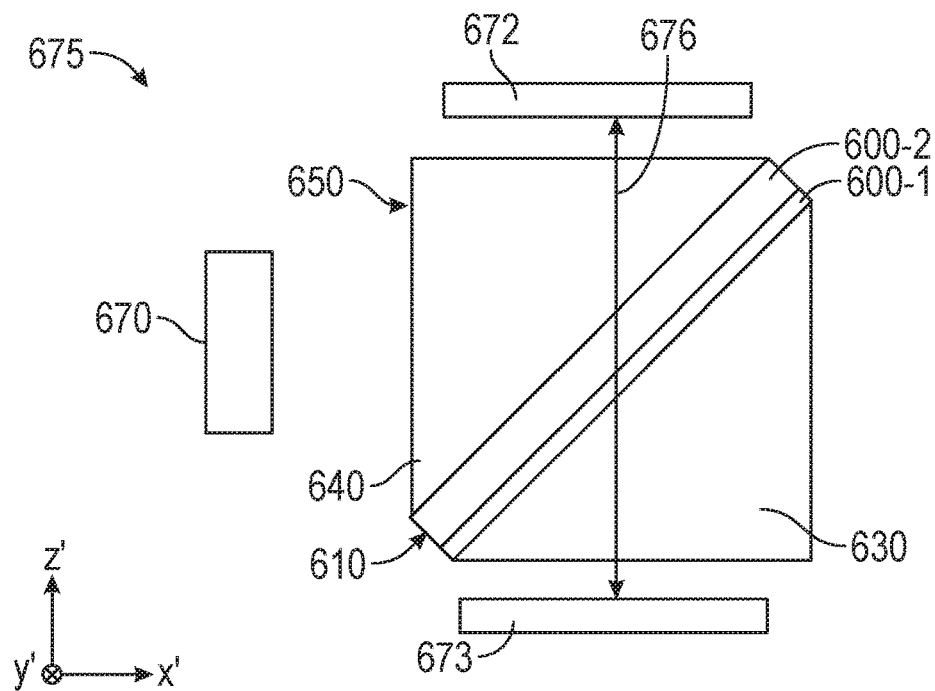
Figure 6C:
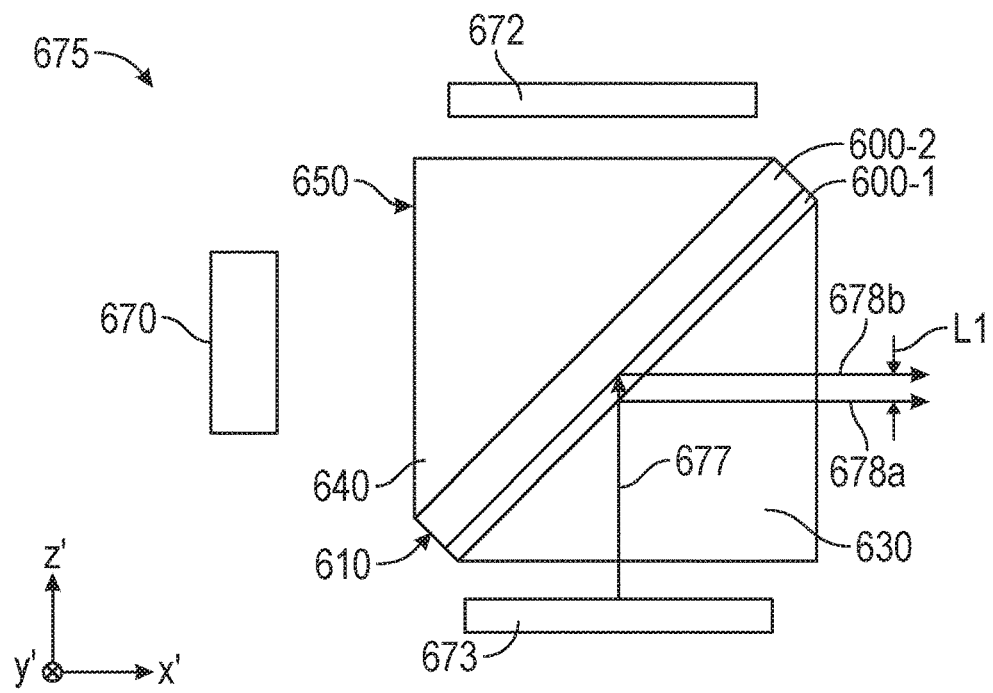

FIGS. 6A-6C are schematic side views of an optical system 675 including a polarizing beam splitter (PBS) illustrating the path of light rays through the optical system 675. The PBS includes an optical stack 610 including first and second polymeric reflective polarizers 600-1 and 600-2. For normally incident light and each wavelength in a wavelength range from about 400 nm to about 650 nm, each reflective polarizer transmits at least 80% of light polarized along a pass axis of the reflective polarizer and reflects at least 90% of light polarized along an orthogonal block axis of the reflective polarizer. The optical system includes a light source 670 facing the second reflective polarizer 600-2 and an imager 673 for modulating light facing the first reflective polarizer 600-1. In the illustrated embodiment, the optical system 675 further includes reflective component 672 and the PBS 650 further includes first and second prisms 630 and 640. In other embodiments, a pellicle design is utilized so that the first and second prisms 630 and 640 are omitted. In some embodiments, the reflective component 672 is a polarization rotating reflector (e.g., a quarter-wave retarder disposed on a mirror). In some embodiments, a quarter-wave retarder and a mirror are disposed directly on a face of second prism 640.

FIG. 6A shows first and second light rays 674a and 674b emitted by the light source 670. The light ray 674a has a first wavelength λa and the second light ray 674b has a second wavelength λb which is different from the first wavelength λa. The first wavelength λa can be 400 nm or 450 nm, and the second wavelength λb can be 650 nm, or 700 nm, for example. The first and first and second light rays 674a and 674*b* are reflected from the second reflective polarizer 600-2 as light rays 675 which follow coincident paths and are illustrated as a single line in the figure. Since the first and second light rays 674*a* and 674*b* have different wavelengths, they reflect from different positions in the second reflective polarizer 600-2.

The light source 670 may include components not shown in the schematic illustrations of FIGS. 6A-6C. For example, the light source 670 may include a plurality of light emitting diodes (LEDs), a color combiner as described in U.S. Pat. Publ. No. 2011/0242653 (Ouderkirk et al.), an integrating optic as described in U.S. Pat. No. 8,382,293 (Phillips, III et al.), and/or a parabolic reflector. The light source 670 may include optics so that light is at least partially collimated and incident over a large fraction (e.g., at least 80 percent of the area) of the face of the second prism 640. The illustrated first and second light rays 674*a* and 674*b* have a lateral separation when incident on the second prism so that when the light rays are reflected from the second reflective polarizer 600-2 they have coincident paths (the light rays travel along the same line segment between the optical stack 610 and the reflective component 672).

The light rays 675 then reflect from the reflective component 672 as light rays 676 which are transmitted through the optical stack 610 as illustrated in FIG. 6B along coincident paths between the reflective component 672 and the imager 673. The light rays 676 are reflected from the imager as reflected rays 677 along coincident paths from the imager 673 to the optical stack 610 and are then reflected from the first reflective polarizer 600-1 as exiting first and second light rays 678*a* and 678*b*, respectively. Since the exiting first and second light rays 678*a* and 678*b* have different wavelengths they are reflected from different positions in the first reflective polarizer 600-1 and therefore exit the PBS with a lateral separation therebetween.

The exiting first and second light rays 678*a* and 678*b* have a lateral separation therebetween of L1. The lateral separation L1 is the distance between the paths taken by the exiting first and second light rays in a direction perpendicular to the paths of the light rays. In some embodiments, the first and second wavelengths λa and λb are 400 nm and 650 nm, respectively, and the lateral separation L1 is less than about 20 micrometers, or less than about 18 micrometers, or less than about 16 micrometers, or less than about 14 micrometers, or less than about 10 micrometers, or less than about 8 micrometers, of less than about 6 micrometers, or less than about 4 micrometers, or less than about 2 micrometers. In some embodiments, the first and second wavelengths λa and λb are 400 nm and 650 nm, respectively, and the lateral separation L1 is greater than about 0.5 micrometers, or greater than about 1 micrometer, or greater than about 2 micrometers, or greater than about 5 micrometers. For example, in some embodiments, the first and second wavelengths λa and λb are 400 nm and 650 nm, respectively, and the lateral separation L1 is in a range of about 1 micrometer, or about 5 micrometers, to about 20 micrometers, or about 18 micrometers.

In one experiment, a PBS was made using a reflective polarizer having a thickness of 40 micrometers for the first reflective polarizer 600-1. The light source 670 was directed through a pinhole of 25 micrometer diameter towards the PBS. In this experiment, a same type of reflective polarizer as the first reflective polarizer 600-1 was used for the second reflective polarizer 600-2. However, since the lateral separation L1 is determined primarily by the first reflective polarizer 600-1, this experiment characterizes the expected color separation of a PBS having a thicker second reflective polarizer 600-2. It was found that the output had a point spread of about 27 micrometers and the color separation between red and blue was about 2.0 micrometers. For comparison, a PBS using two reflective polarizers each having a thickness of 80 micrometers was found to have a point spread of about 50 micrometers the color separation between red and blue was about 25 micrometers.

The optical system 675 may use a color-sequential system to display colors using a single reflective pixel. Color-sequential imaging systems are described in U.S. Pat. Appl. Publ. No. 2012/0320103 (Jesme et al.), for example. In some embodiments, the first and second light rays 674*a* and 674*b* are emitted at different times (e.g., during different color subframes). In this case, the reflected light rays 677, for example, propagate along coincident paths from the imager 673 to the optical stack 610 at different times and the exiting first and second rays 678*a* and 678*b* exit the PBS 650 along laterally separated paths at different times.

In some embodiments, the optical stack 610 is disposed at about a 45 degree angle to the face of the second prism 650 facing the light source 670 and the first reflective polarizer has an interference layer closest to the first prism 630 configured to reflect light incident at 45 degrees in the block polarization state having the first wavelength and an interference layer farthest from the first prism 630 configured to reflect light incident at 45 degrees in the block polarization state having the second wavelength. In some such embodiments, the lateral separation L1 is about $\sqrt{2}$ d1 where d1 is a separation between the two interference layers in the plurality of interference layers of the first reflective polarizer 600-1 farthest from each other.

In the illustrated embodiment, the first and second prisms 630 and 640 are right isosceles triangular prisms. In other embodiments, other prism shapes are used. For example, one or more faces of the prisms may be curved. For example, the face of the second prism 640 facing the reflective component 672 may be curved. The reflective component 672 may be disposed on and conform to this curved face. In other embodiments, the reflective component 672 is curved but is not disposed directly on the second prism 640. For example, the reflective component 672 may be disposed on a curved surface of a lens disposed proximate the second prism 640. In some embodiments, the hypotenuses of the first and second prisms 630 and 640 are curved and the optical stack 610 is disposed on and conforms to each curved hypotenuse. Useful PBS geometries are described in U.S. Prov. Pat. Appl. No. 62/577,203 filed Oct. 26, 2017, for example.

Figure 8:
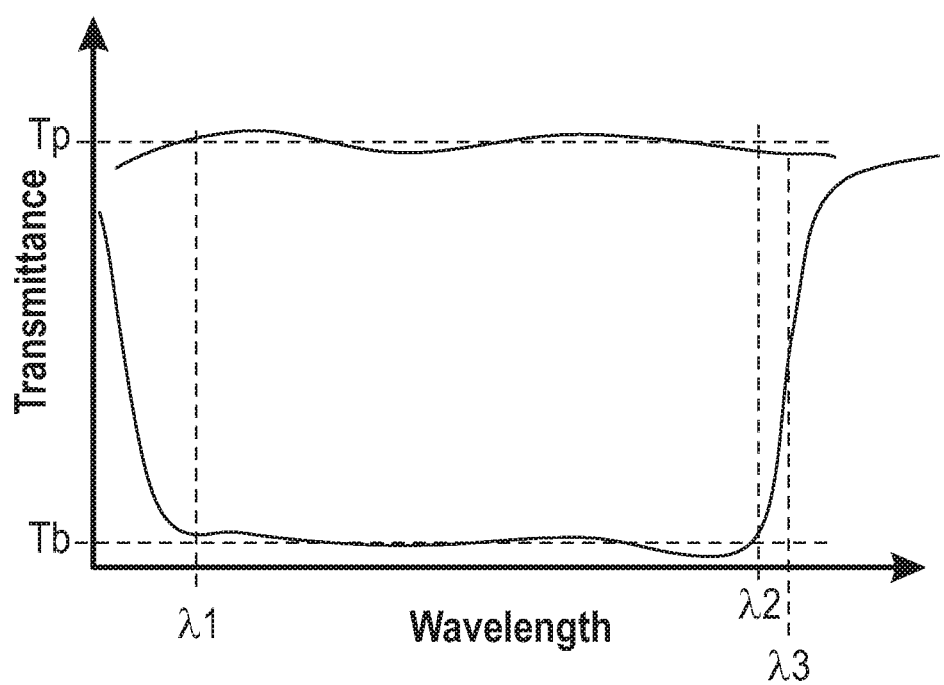
FIG. 8 is a schematic plot of the transmittance of a reflective polarizer.

FIG. 8 is a schematic plot of the transmittance of a reflective polarizer for the pass and block states of the reflective polarizer for light at a predetermined angle of incidence on the reflective polarizer. The predetermined angle of incidence may be 0 degrees (normal incidence), about 45 degrees, or at an angle of incidence appropriate for a given application (e.g., 90 degrees minus the angle α depicted in FIG. 5). The average of the transmittance over wavelengths is a maximum for normally incident light having a pass polarization state (polarized along a pass axis) and the average of the transmittance over wavelengths is a minimum for normally incident light having a block polarization state (polarized along a block axis). The average of the transmittance over wavelengths in the predetermined wavelength range from λ1 to λ2 is Tp in the pass state and Tb in the block state. In some embodiments, λ1 is about 400 nm or about 450 nm, and λ2 is about 650 nm or about 700 nm. In some embodiments Tp for one or both of the first and second reflective polarizers is at greater than about 80%, or greater than about 85%, or greater than 88%. In some embodiments, Tb for one or both of the first and second reflective polarizers is no more than about 10%, or no more than about 5%, or no more than about 2%, or no more than about 1%, or no more than about 0.5%, or no more than 0.2%, or no more than 0.15%, or no more than 0.1%, or no more than 0.05%, or no more than 0.04%, or no more than 0.03%. In some embodiments, the transmittance at each wavelength in the predetermined wavelength range is in one or more of these ranges.

Figure 9:
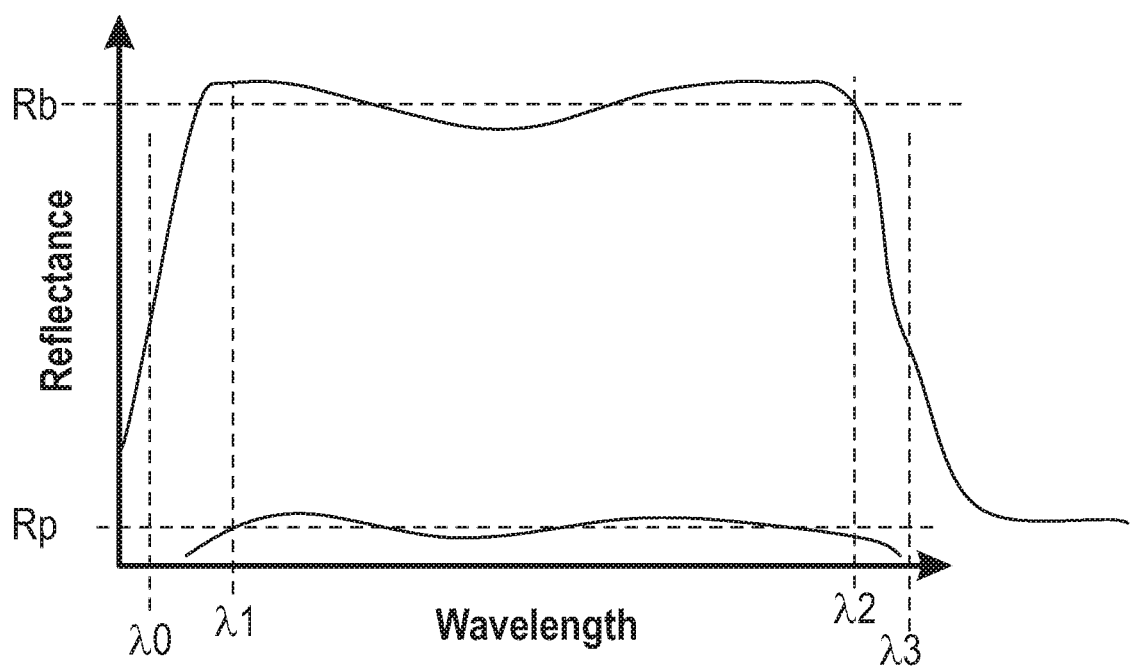
FIG. 9 is a schematic plot of the reflectance of a reflective polarizer.

FIG. 9 is a schematic plot of the reflectance of a reflective polarizer for the pass and block states of the reflective polarizer for light at the predetermined angle of incidence on the reflective polarizer. The average of the reflectance over wavelengths is a maximum for normally incident light having the block polarization state, and the average of the reflectance over wavelengths is a minimum for normally incident light having the pass polarization state. The average of the reflectance over wavelengths in the predetermined wavelength range from $\lambda 1$ to $\lambda 2$ is Rp in the pass state and Rb in the block is state. In some embodiments, Rb for one or both of the first and second reflective polarizers is greater than about 80%, or greater than about 85%, or greater than about 90%, or greater than about 95%. In some embodiments, Rp for one or both of the first and second reflective polarizers is no more than about 20%, or no more than about 15%, or no more than about 10%, or no more than about 5%, or no more than 4%. In some embodiments, the reflectance at each wavelength in the predetermined wavelength range is in one or more of these ranges.

A long wavelength band edge $\lambda 3$ is illustrated in FIGS. 8-9 and a short wavelength band edge $\lambda 0$ is indicated in FIG. 9. Reflection bands typically have both long and short wavelength band edges where the reflectance rapidly drops. In the illustrated embodiment, the short wavelength band edge $\lambda 0$ is less than $\lambda 1$ and the long wavelength band edge $\lambda 3$ is greater than $\lambda 2$. The band edges are determined for light incident at the predetermined angle of incidence. The precise wavelength of a band edge can be defined using several different criteria. The wavelength of the band edge may be can be taken to be the wavelength where the reflectance for normally incident light having the block polarization state drops to ½ Rb or the wavelength where the transmittance for normally incident light having the block polarization state increases to 10%, for example. The first and second reflective polarizers of an optical stack may be adapted to reflect and transmit block and pass polarized light, respectively, over a same predetermined wavelength range. That is, $\lambda 1$ and $\lambda 2$ may be the same for both reflective polarizers. However, in some embodiments, the band edges $\lambda 0$ and $\lambda 3$ for the reflective polarizers may differ. In other embodiments, the band edges $\lambda 0$ and $\lambda 3$ for the first and second reflective polarizers are about the same.

The following is a list of exemplary embodiments of the present description.

Embodiment 1 is an optical stack comprising a first reflective polarizer adhered to a second reflective polarizer, for normally incident light and each wavelength in a same predetermined wavelength range extending at least from 400 nm to 600 nm, each reflective polarizer transmitting at least 80% of light polarized along a pass axis of the reflective polarizer and reflecting at least 90% of light polarized along an orthogonal block axis of the reflective polarizer, an angle between the pass axes of the first and second reflective polarizers less than about 10 degrees, each reflective polarizer comprising a plurality of polymeric interference layers reflecting and transmitting light primarily by optical interference in the predetermined wavelength range, a separation between the two polymeric interference layers in the plurality of polymeric interference layers farthest from each other being d1 and d2 for the respective first and second reflective polarizers, d1 at least 20% less than d2.

Embodiment 2 is the optical stack of Embodiment 1, wherein d1≤0.7 d2.

Embodiment 3 is the optical stack of Embodiment 1, wherein d1≤0.6 d2.

Embodiment 4 is the optical stack of Embodiment 1, wherein d1≥0.05 d2.

Embodiment 5 is the optical stack of Embodiment 1, wherein d1≥0.1 d2.

Embodiment 6 is the optical stack of Embodiment 1, wherein d1 is at least 1 micrometer.

Embodiment 7 is the optical stack of Embodiment 1, wherein d1 is at least 10 micrometers.

Embodiment 8 is the optical stack of Embodiment 1, wherein d2 is no more than 200 micrometers.

Embodiment 9 is the optical stack of Embodiment 1, wherein each polymeric interference layer has an average thickness in a range of 45 nanometers to 200 nanometers.

Embodiment 10 is the optical stack of Embodiment 1, wherein the angle between the pass axes of the first and second reflective polarizers is less than about 5 degrees.

Embodiment 11 is the optical stack of Embodiment 1, wherein the angle between the pass axes of the first and second reflective polarizers is less than about 2 degrees.

Embodiment 12 is the optical stack of Embodiment 1, wherein the predetermined wavelength range extends at least from 400 nm to 650 nm.

Embodiment 13 is the optical stack of Embodiment 1, wherein the predetermined wavelength range extends at least from 400 nm to 700 nm.

Embodiment 14 is the optical stack of Embodiment 1 having opposite outermost first and second major surfaces, the first reflective polarizer disposed closer to the first major surface and farther from the second major surface, the second reflective polarizer disposed closer to the second major surface and farther from the first major surface, wherein for each reflective polarizer and the major surface closest to the reflective polarizer, each polymeric interference layer closer to the major surface has a smaller optical thickness and each interference layer farther from the major surface has a larger optical thickness.

Embodiment 15 is a polarizing beam splitter (PBS) comprising:
a first prism comprising a first hypotenuse;
a second prism comprising a second hypotenuse facing the first hypotenuse; and
the optical stack of any one of Embodiments 1 to 14 disposed between and adhered to the first and second hypotenuses.

Embodiment 16 is the PBS of Embodiment 15, wherein the predetermined wavelength extends from a shorter first wavelength to a longer second wavelength, wherein coincident first and second light rays having the respective first and second wavelengths and incident at 45 degrees on each reflective polarizer from an inside of the prism facing the reflective polarizer, are reflected by the reflective polarizer as respective reflected first and second light rays spaced apart from each other by a separation distance inside the prism facing the reflective polarizer, the separation distance being s1 for the first reflective polarizer and s2 for the second reflective polarizer, 0<s1≤s2.

Embodiment 17 is an optical system comprising:
the PBS of Embodiment 15 or 16;
a light source facing the first reflective polarizer; and
an imager for modulating light facing the second reflective polarizer.

Embodiment 18 is the optical system of Embodiment 17 being configured such that first and second light rays emitted by the light source and having respective 400 nm and 650 nm wavelengths, exit the PBS as respective exiting first and second light rays after being at least once reflected and at least once transmitted by the second reflective polarizer, reflected by the imager along coincident paths, and at least once reflected by the first reflective polarizer, a lateral separation between the exiting first and second light rays being less than about 20 micrometers.

Embodiment 19 is a polarizing beam splitter (PBS) comprising:
a first prism comprising a first hypotenuse;
a second prism comprising a second hypotenuse facing the first hypotenuse; and
an optical stack disposed between and adhered to the first and second hypotenuses, the optical stack comprising a first reflective polarizer adhered to a second reflective polarizer, for normally incident light and each wavelength in a same predetermined wavelength range, each reflective polarizer transmitting at least 80% of light polarized along a pass axis of the reflective polarizer and reflecting at least 90% of light polarized along an orthogonal block axis of the reflective polarizer, an angle between the pass axes of the first and second reflective polarizers less than about 10 degrees, each reflective polarizer comprising a plurality of polymeric interference layers reflecting and transmitting light primarily by optical interference in the predetermined wavelength range, a separation between the two polymeric interference layers in the plurality of polymeric interference layers farthest from another being d1 and d2 for the respective first and second reflective polarizers, d1 at least 20% less than d2.

Embodiment 20 is the PBS of Embodiment 19, wherein d1≤0.7 d2.

Embodiment 21 is the PBS of Embodiment 19, wherein d1≤0.6 d2.

Embodiment 22 is the PBS of Embodiment 19, wherein d1≤0.5 d2.

Embodiment 23 is the PBS of Embodiment 19, wherein d1≥0.1 d2.

Embodiment 24 is the PBS of Embodiment 19, wherein d1 is at least 1 micrometer.

Embodiment 25 is the PBS of Embodiment 19, wherein d1 is at least 10 micrometers.

Embodiment 26 is the PBS of Embodiment 19, wherein d2 is no more than 200 micrometers.

Embodiment 27 is the PBS of Embodiment 19, wherein each polymeric interference layer has an average thickness in a range of about 45 nanometers to about 200 nanometers.

Embodiment 28 is the PBS of Embodiment 19, wherein the first reflective polarizer disposed is closer to the first hypotenuse and farther from the second hypotenuse, the second reflective polarizer is disposed closer to the second hypotenuse and farther from the first hypotenuse, wherein for each reflective polarizer and the hypotenuse closest to the reflective polarizer, each polymeric interference layer closer to the hypotenuse has a smaller optical thickness and each interference layer farther from the hypotenuse has a larger optical thickness.

Embodiment 29 is the PBS of Embodiment 19, wherein the angle between the pass axes of the first and second reflective polarizers is less than about 5 degrees.

Embodiment 30 is the PBS of Embodiment 19, wherein the angle between the pass axes of the first and second reflective polarizers is less than about 2 degrees.

Embodiment 31 is the PBS of any one of Embodiments 19 to 30, wherein the predetermined wavelength extends from a shorter first wavelength to a longer second wavelength, wherein coincident first and second light rays having the respective first and second wavelengths and incident at 45 degrees on each reflective polarizer from an inside of the prism facing the reflective polarizer, are reflected by the reflective polarizer as respective reflected first and second light rays spaced apart from each other by a separation distance inside the prism facing the reflective polarizer, the separation distance being s1 for the first reflective polarizer and s2 for the second reflective polarizer, $0<s1\leq s2$.

Embodiment 32 is an optical system comprising:
the PBS of any one of Embodiments 19 to 31;
a light source facing the second reflective polarizer; and
an imager for modulating light facing the first reflective polarizer.

Embodiment 33 is the optical system of Embodiment 32 being configured such that first and second light rays emitted by the light source and having respective 400 nm and 650 nm wavelengths, exit the PBS as respective exiting first and second light rays after being at least once reflected and at least once transmitted by the second reflective polarizer, reflected by the imager along coincident paths, and at least once reflected by the first reflective polarizer, a lateral separation between the exiting first and second light rays being less than about 20 micrometers.

Embodiment 34 is an optical construction comprising an optical stack disposed between and adhered to first and second optical elements, the optical stack comprising a first reflective polarizer facing the first optical element and adhered to a second reflective polarizer facing the second optical element, each reflective polarizer transmitting at least 80% of light polarized along a pass axis of the reflective polarizer and reflecting at least 80% of light polarized along an orthogonal block axis of the reflective polarizer in a same predetermined wavelength range extending from a shorter first wavelength to a longer second wavelength, coincident first and second light rays having the respective first and second wavelengths and incident at 45 degrees on each reflective polarizer from an inside of the optical element facing the reflective polarizer, are reflected by the reflective polarizer as respective reflected first and second light rays spaced apart from each other by a separation distance inside the optical element facing the reflective polarizer, the separation distance being s1 for the first reflective polarizer and s2 for the second reflective polarizer, $0<s1\leq s2$.

Embodiment 35 is the optical construction of Embodiment 34, wherein at least one of the first and second reflective polarizers comprises a plurality of polymeric interference layers reflecting and transmitting light primarily by optical interference in the predetermined wavelength range.

Embodiment 36 is the optical construction of Embodiment 35, wherein each polymeric interference layer has an average thickness in a range of about 45 nanometers to about 200 nanometers.

Embodiment 37 is the optical construction of Embodiment 34, wherein each the first and second reflective polarizers comprises a plurality of polymeric interference layers reflecting and transmitting light primarily by optical interference in the predetermined wavelength range.

Embodiment 38 is the optical construction of Embodiment 37, wherein a separation between the two polymeric interference layers in the plurality of polymeric interference layers farthest from each other is d1 and d2 for the respective first and second reflective polarizers, d1 at least 20% less than d2.

Embodiment 39 is the optical construction of Embodiment 37, wherein for each reflective polarizer and the optical element that the reflective polarizer faces, each polymeric interference layer closer to the optical element has a smaller optical thickness and each interference layer farther from the optical element has a larger optical thickness.

Embodiment 40 is the optical construction of Embodiment 34, wherein s1 is greater than 500 nm.

Embodiment 41 is the optical construction of Embodiment 34 or 40, wherein s2 is greater than s1.

Embodiment 42 is the optical construction of Embodiment 34 or 40, wherein s2>s1+500 nm.

Embodiment 43 is the optical construction of Embodiment 34 being a polarizing beam splitter, the first optical element being a first prism comprising a first hypotenuse, the second optical element being a second prism comprising a second hypotenuse facing the first hypotenuse, wherein the optical stack disposed between and adhered to the first and second hypotenuses.

Embodiment 44 is the optical construction of Embodiment 34, wherein the first wavelength is in a range of about 400 nm to about 500 nm and the second wavelength is in a range of about 600 nm to about 700 nm.

Embodiment 45 is the optical construction of Embodiment 34, wherein the first wavelength is in a range of about 400 nm to about 450 nm and the second wavelength is in a range of about 650 nm to about 700 nm.

Embodiment 46 is the optical construction of Embodiment 34, wherein the first wavelength is 400 nm and the second wavelength is 650 nm.

Embodiment 47 is the optical construction of Embodiment 34, wherein an angle between the pass axes of the first and second reflective polarizers is less than about 10 degrees.

Embodiment 48 is the optical construction of Embodiment 34, wherein an angle between the pass axes of the first and second reflective polarizers is less than about 5 degrees.

Embodiment 49 is the optical construction of Embodiment 34, wherein an angle between the pass axes of the first and second reflective polarizers is less than about 2 degrees.

Embodiment 50 is an optical system comprising:
the optical construction of any one of Embodiments 34 to 49;
a light source facing the second reflective polarizer; and
an imager for modulating light facing the first reflective polarizer.

Embodiment 51 is the optical system of Embodiment 50 being configured such that first and second light rays emitted by the light source and having respective 400 nm and 650 nm wavelengths, exit the optical construction as respective exiting first and second light rays after being at least once reflected and at least once transmitted by the first reflective polarizer, reflected by the imager along coincident paths, and at least once reflected by the second reflective polarizer, a lateral separation between the exiting first and second light rays being less than about 20 micrometers.

Embodiment 52 is an optical system comprising:
a polarizing beam splitter (PBS) comprising an optical stack comprising first and second polymeric reflective polarizers, for normally incident light and each wavelength in a wavelength range from about 400 nm to about 650 nm, each reflective polarizer transmitting at least 80% of light polarized along a pass axis of the reflective polarizer and reflecting at least 90% of light polarized along an orthogonal block axis of the reflective polarizer;
a light source facing the second reflective polarizer; and
an imager for modulating light facing the first reflective polarizer,
such that first and second light rays emitted by the light source and having the respective 400 nm and 650 nm wavelengths, exit the PBS as respective exiting first and second light rays after being at least once reflected and at least once transmitted by the second reflective polarizer, reflected by the imager along coincident paths, and at least once reflected by the first reflective polarizer, a lateral separation between the exiting first and second light rays being less than about 20 micrometers.

Embodiment 53 is the optical system of Embodiment 52, wherein the lateral separation between the exiting first and second light rays is less than about 18 micrometers, or less than about 16 micrometers, or less than about 14 micrometers, or less than about 10 micrometers, or less than about 8 micrometers, of less than about 6 micrometers, or less than about 4 micrometers, or less than about 2 micrometers.

Embodiment 54 is the optical system of Embodiment 52 or 53, wherein the lateral separation between the exiting first and second light rays is greater than about 0.5 micrometers, or greater than about 1 micrometer.

Embodiment 55 is the optical system of Embodiment 52, wherein at least one of the first and second reflective polarizers comprises a plurality of polymeric interference layers reflecting and transmitting light primarily by optical interference in the predetermined wavelength range.

Embodiment 56 is the optical system of Embodiment 55, wherein each polymeric interference layer has an average thickness in a range of about 45 nanometers to about 200 nanometers.

Embodiment 57 is the optical system of Embodiment 52, wherein each the first and second reflective polarizers comprises a plurality of polymeric interference layers reflecting and transmitting light primarily by optical interference in the predetermined wavelength range.

Embodiment 58 is the optical system of Embodiment 57, wherein a separation between the two polymeric interference layers in the plurality of polymeric interference layers farthest from each other is d1 and d2 for the respective first and second reflective polarizers, d1 being at least 20% less than d2.

Embodiment 59 is the optical system of Embodiment 57, wherein the optical stack has opposite outermost first and second major surfaces, the first reflective polarizer disposed closer to the first major surface and farther from the second major surface, the second reflective polarizer disposed closer to the second major surface and farther from the first major surface, wherein for each reflective polarizer and the major surface closest to the reflective polarizer, each polymeric interference layer closer to the major surface has a smaller optical thickness and each interference layer farther from the major surface has a larger optical thickness.

Embodiment 60 is the optical system of Embodiment 52, wherein the PBS comprises a first prism comprising a first hypotenuse, and
a second prism comprising a second hypotenuse facing the first hypotenuse, wherein the optical stack is disposed between and adhered to the first and second hypotenuses.

Embodiment 61 is the optical system of Embodiment 52, wherein an angle between the pass axes of the first and second reflective polarizers is less than about 10 degrees.

Embodiment 62 is the optical system of Embodiment 52, wherein an angle between the pass axes of the first and second reflective polarizers is less than about 5 degrees. Embodiment 63 is the optical system of Embodiment 52, wherein an angle between the pass axes of the first and second reflective polarizers is less than about 2 degrees.

If the use of "about" as applied to quantities expressing feature sizes, amounts, and physical properties is not otherwise clear to one of ordinary skill in the art in the context in which it is used and described in the present description, "about" will be understood to mean within 10 percent of the specified quantity, but also includes exactly the specified quantity. For example, if it is not otherwise clear to one of ordinary skill in the art in the context in which it is used and described in the present description, a quantity having a value of about 1, means that the quantity has a value between 0.9 and 1.1, but also includes a value of exactly 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical stack comprising a first reflective polarizer adhered to a second reflective polarizer, for normally incident light and each wavelength in a same predetermined wavelength range extending at least from 400 nm to 600 nm, each reflective polarizer transmitting at least 80% of light polarized along a pass axis of the reflective polarizer and reflecting at least 90% of light polarized along an orthogonal block axis of the reflective polarizer, an angle between the pass axes of the first and second reflective polarizers less than about 10 degrees, each reflective polarizer comprising a plurality of polymeric interference layers reflecting and transmitting light primarily by optical interference in the predetermined wavelength range, a separation between the two polymeric interference layers in the plurality of polymeric interference layers farthest from each other being d1 and d2 for the respective first and second reflective polarizers, d1 at least 20% less than d2.

2. The optical stack of claim 1, wherein d1 is at least 1 micrometer.

3. The optical stack of claim 1, wherein each polymeric interference layer has an average thickness in a range of 45 nanometers to 200 nanometers.

4. The optical stack of claim 1 having opposite outermost first and second major surfaces, the first reflective polarizer disposed closer to the first major surface and farther from the second major surface, the second reflective polarizer disposed closer to the second major surface and farther from the first major surface, wherein for each reflective polarizer and the major surface closest to the reflective polarizer, each polymeric interference layer closer to the major surface has a smaller optical thickness and each interference layer farther from the major surface has a larger optical thickness.

5. A polarizing beam splitter (PBS) comprising:
   a first prism comprising a first hypotenuse;
   a second prism comprising a second hypotenuse facing the first hypotenuse; and
   the optical stack of claim 1 disposed between and adhered to the first and second hypotenuses.

6. The PBS of claim 5, wherein the predetermined wavelength extends from a shorter first wavelength to a longer second wavelength, wherein coincident first and second light rays having the respective first and second wavelengths and incident at 45 degrees on each reflective polarizer from an inside of the prism facing the reflective polarizer, are reflected by the reflective polarizer as respective reflected first and second light rays spaced apart from each other by a separation distance inside the prism facing the reflective polarizer, the separation distance being s1 for the first reflective polarizer and s2 for the second reflective polarizer, $0 < s1 \leq s2$.

7. An optical system comprising:
   the PBS of claim 5;
   a light source facing the first reflective polarizer; and
   an imager for modulating light facing the second reflective polarizer.

8. The optical system of claim 7 being configured such that first and second light rays emitted by the light source and having respective 400 nm and 650 nm wavelengths, exit the PBS as respective exiting first and second light rays after being at least once reflected and at least once transmitted by the second reflective polarizer, reflected by the imager along coincident paths, and at least once reflected by the first reflective polarizer, a lateral separation between the exiting first and second light rays being less than about 20 micrometers.

9. An optical construction comprising an optical stack disposed between and adhered to first and second optical elements, the optical stack comprising a first reflective polarizer facing the first optical element and adhered to a second reflective polarizer facing the second optical element, each reflective polarizer transmitting at least 80% of light polarized along a pass axis of the reflective polarizer and reflecting at least 80% of light polarized along an orthogonal block axis of the reflective polarizer in a same predetermined wavelength range extending from a shorter first wavelength to a longer second wavelength, coincident first and second light rays having the respective first and second wavelengths and incident at 45 degrees on each reflective polarizer from an inside of the optical element facing the reflective polarizer, are reflected by the reflective polarizer as respective reflected first and second light rays spaced apart from each other by a separation distance inside the optical element facing the reflective polarizer, the separation distance being s1 for the first reflective polarizer and s2 for the second reflective polarizer, $0 < s1 \leq s2$.

10. The optical construction of claim 9, wherein each the first and second reflective polarizers comprises a plurality of polymeric interference layers reflecting and transmitting light primarily by optical interference in the predetermined wavelength range.

11. The optical construction of claim 10, wherein for each reflective polarizer and the optical element that the reflective polarizer faces, each polymeric interference layer closer to the optical element has a smaller optical thickness and each interference layer farther from the optical element has a larger optical thickness.

12. The optical construction of claim 9, wherein s1 is greater than 500 nm.

13. The optical construction of claim 9, wherein s2>s1+500 nm.

14. An optical system comprising:
- a polarizing beam splitter (PBS) comprising an optical stack comprising first and second polymeric reflective polarizers, for normally incident light and each wavelength in a wavelength range from about 400 nm to about 650 nm, each reflective polarizer transmitting at least 80% of light polarized along a pass axis of the reflective polarizer and reflecting at least 90% of light polarized along an orthogonal block axis of the reflective polarizer;
- a light source facing the second reflective polarizer; and
- an imager for modulating light facing the first reflective polarizer,
- such that first and second light rays emitted by the light source and having the respective 400 nm and 650 nm wavelengths, exit the PBS as respective exiting first and second light rays after being at least once reflected and at least once transmitted by the second reflective polarizer, reflected by the imager along coincident paths, and at least once reflected by the first reflective polarizer, a lateral separation between the exiting first and second light rays being less than about 20 micrometers.

15. The optical system of claim 14, wherein the lateral separation between the exiting first and second light rays is greater than about 0.5 micrometers.

* * * * *